(12) United States Patent
Soled et al.

(10) Patent No.: US 8,722,564 B2
(45) Date of Patent: May 13, 2014

(54) HYDROPROCESSING CATALYSTS AND THEIR PRODUCTION

(75) Inventors: Stuart L. Soled, Pittstown, NJ (US); Sabato Miseo, Pittstown, NJ (US); Joseph E. Baumgartner, Califon, NJ (US); Iulian Nistor, Center Valley, PA (US); Pallassana S. Venkataraman, Annandale, VA (US); Chris E. Kliewer, Clinton, NJ (US); Robert J. Chimenti, Short Hills, NJ (US); Javier Guzman, Easton, PA (US); Gordon Kennedy, Washington, NJ (US); Doron Levin, Highland Park, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/150,720

(22) Filed: Jun. 1, 2011

(65) Prior Publication Data

US 2011/0294657 A1    Dec. 1, 2011

Related U.S. Application Data

(60) Provisional application No. 61/350,234, filed on Jun. 1, 2010.

(51) Int. Cl.
*B01J 31/00*    (2006.01)
(52) U.S. Cl.
USPC ............................. 502/167; 502/170; 502/439
(58) Field of Classification Search
None
See application file for complete search history.

(56) References Cited

U.S. PATENT DOCUMENTS

| 3,975,302 | A | 8/1976 | Courty et al. |
| 4,528,089 | A | 7/1985 | Pecoraro et al. |
| 6,280,610 | B1 | 8/2001 | Uragami et al. |
| 6,566,296 | B2 * | 5/2003 | Plantenga et al. ............ 502/162 |
| 6,753,291 | B2 | 6/2004 | Eijsbouts et al. |
| 6,989,348 | B2 | 1/2006 | Eijsbouts |

(Continued)

FOREIGN PATENT DOCUMENTS

| CN | 101088615 | 1/2007 |
| CN | 101088615 A | 12/2007 |

(Continued)

OTHER PUBLICATIONS

Copending U.S. Appl. No. 13/150,662.

*Primary Examiner* — Melissa Stalder
(74) *Attorney, Agent, or Firm* — David M. Weisberg; Bruce M. Bordelon; Chad A. Guice

(57) ABSTRACT

Described herein is a catalyst precursor composition comprising at least one metal from Group 6 of the Periodic Table of the Elements, at least one metal from Groups 8-10 of the Periodic Table of the Elements, and a reaction product formed from (i) a first organic compound containing at least one amine group and at least 10 carbon atoms or (ii) a second organic compound containing at least one carboxylic acid group and at least 10 carbon atoms, but not both, wherein the reaction product contains additional unsaturated carbon atoms, relative to the first or second organic compound, wherein the metals of the catalyst precursor composition are arranged in a crystal lattice, and wherein the reaction product is not located within the crystal lattice. A process for preparing the catalyst precursor composition is also described, as is sulfiding the catalyst precursor composition to form a hydroprocessing catalyst.

21 Claims, 14 Drawing Sheets

(56) References Cited

U.S. PATENT DOCUMENTS

| | | |
|---|---|---|
| 7,304,013 B2 | 12/2007 | Addiego et al. |
| 7,544,285 B2 | 6/2009 | Domokos et al. |
| 7,544,632 B2 | 6/2009 | Soled et al. |
| 7,591,942 B2 | 9/2009 | Soled et al. |
| 7,678,731 B2 | 3/2010 | Mironov et al. |
| 7,737,072 B2 | 6/2010 | Mironov et al. |
| 7,737,073 B2 | 6/2010 | Mironov et al. |
| 7,754,645 B2 | 7/2010 | Kuperman et al. |
| 7,803,735 B2 | 9/2010 | Maesen et al. |
| 7,807,599 B2 | 10/2010 | Maesen et al. |
| 7,838,696 B2 | 11/2010 | Maesen et al. |
| 7,910,761 B2 | 3/2011 | Maesen et al. |
| 7,931,799 B2 | 4/2011 | Dykstra et al. |
| 7,956,000 B2 | 6/2011 | Jansen et al. |
| 7,964,524 B2 | 6/2011 | Kuperman et al. |
| 7,964,525 B2 | 6/2011 | Dykstra et al. |
| 7,964,526 B2 | 6/2011 | Maesen et al. |
| 2004/0132614 A1 | 7/2004 | Harle et al. |
| 2006/0058174 A1 | 3/2006 | Chen et al. |
| 2007/0072765 A1 | 3/2007 | Soled et al. |
| 2007/0227947 A1 | 10/2007 | Reynolds |
| 2008/0131343 A1 | 6/2008 | Oogjen et al. |
| 2008/0305947 A1 | 12/2008 | Chen et al. |
| 2009/0011930 A1 | 1/2009 | Hagemeyer |
| 2009/0054225 A1 | 2/2009 | Mironov et al. |
| 2009/0111683 A1 | 4/2009 | Zhan et al. |
| 2009/0114566 A1 | 5/2009 | Chen et al. |
| 2009/0156392 A1 | 6/2009 | Kharas |
| 2009/0159489 A1 | 6/2009 | Lopez et al. |
| 2010/0234212 A1 | 9/2010 | Brait et al. |
| 2010/0279856 A1 | 11/2010 | Dykstra et al. |
| 2011/0087060 A1 | 4/2011 | Yao et al. |
| 2011/0124493 A1 | 5/2011 | Kuperman et al. |
| 2011/0124494 A1 | 5/2011 | Mironov et al. |
| 2011/0124496 A1 | 5/2011 | Mironov et al. |
| 2011/0124498 A1 | 5/2011 | Kuperman et al. |

FOREIGN PATENT DOCUMENTS

| | | |
|---|---|---|
| CN | 101088615 A1 | 12/2007 |
| CN | 101468309 A | 7/2009 |
| CN | 102051217 A | 5/2011 |
| EP | 0 181 035 B1 | 8/1990 |
| EP | 0 601 722 B1 | 9/1998 |
| EP | 1 041 133 A1 | 10/2000 |
| JP | 2000300991 A | 10/2000 |
| WO | 95/31280 | 11/1995 |
| WO | 96/41848 | 12/1996 |
| WO | 00/41810 | 7/2000 |
| WO | 00/41811 | 7/2000 |
| WO | 0176738 A1 | 10/2001 |
| WO | 0176740 A1 | 10/2001 |
| WO | 0204117 | 1/2002 |
| WO | 0220702 A1 | 3/2002 |
| WO | 0224620 A2 | 3/2002 |
| WO | 2004073854 A1 | 9/2004 |
| WO | 2004073859 A1 | 9/2004 |
| WO | 2005005582 A1 | 1/2005 |
| WO | 2006040427 A1 | 4/2006 |
| WO | 2006119311 A2 | 11/2006 |
| WO | 2007048598 A2 | 5/2007 |
| WO | 2007084471 | 7/2007 |
| WO | 2007084471 A1 | 7/2007 |
| WO | 2009126278 | 10/2009 |

* cited by examiner

Figures 16A-B. Infrared data characterizing NiW(oleylamine)$_{0.13}$(citric acid)$_{0.15}$ of Example 37.
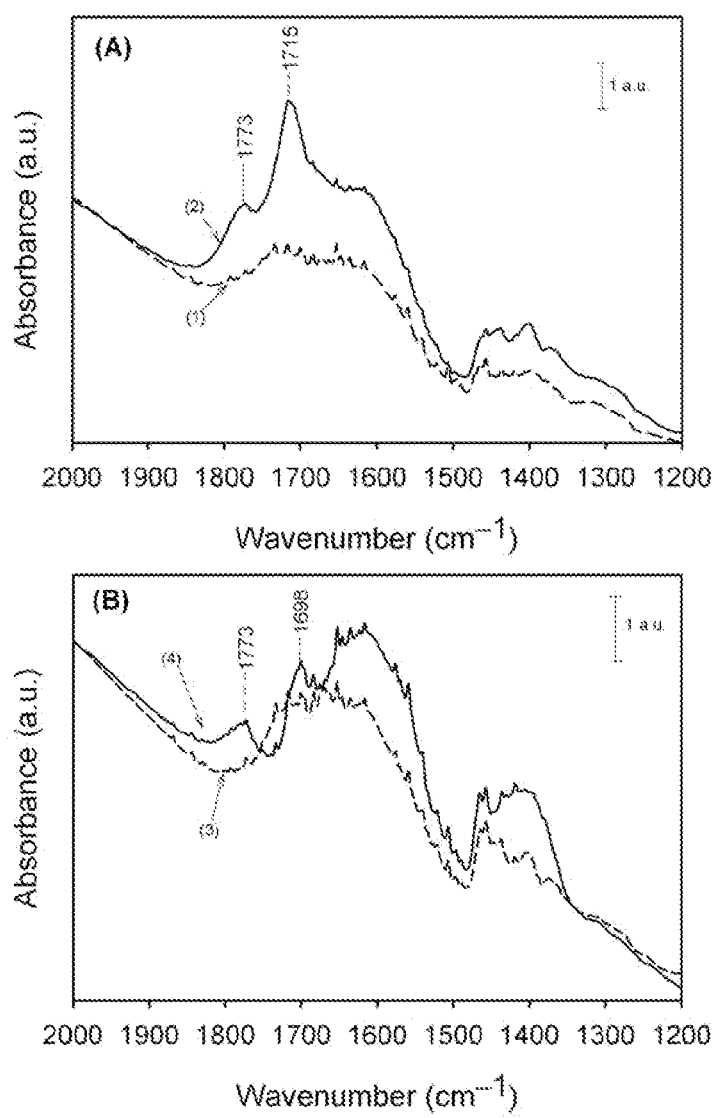

HYDROPROCESSING CATALYSTS AND THEIR PRODUCTION

CROSS-REFERENCE TO RELATED APPLICATIONS

This Application claims the benefit of Provisional U.S. Application No. 61/350,234, filed Jun. 1, 2010, the contents of which are hereby incorporated by reference herein.

FIELD

The invention relates generally to hydroprocessing catalysts and their production.

BACKGROUND

At the same time as environmental regulations are mandating lower levels of sulfur and nitrogen in distillate fuels, refineries are being forced to process crude oils with larger amounts of these heteroatoms. In addition, residual S- and/or N-containing molecules can poison metal or acid sites on catalysts used downstream of a hydroprocessing process, such as in hydrocrackers. A need therefore exists to find catalysts which will do more efficient desulfurization and/or denitrogenation, particularly when existing hydroprocessing units are limited in their pressure capability.

Hydroprocessing catalysts usually comprise a sulfided Group 6 metal with one or more Group 8 to 10 metals as promoters on a refractory support, such as alumina. Bulk, unsupported catalysts are also known. Hydroprocessing catalysts that are particularly suitable for hydrodesulfurization, as well as hydrodenitrogenation, generally comprise molybdenum or tungsten sulfide promoted with a metal such as cobalt, nickel, iron, or a combination thereof. These sulfided catalysts generally have a layered or platelet morphology.

The ability to modify the nanostructural morphology of hydroprocessing catalysts appears to provide a possible way to control their activity and selectivity. Thus one of the important thrusts in hydroprocessing catalyst research appears to be the realization that a key synthesis tool for modifying nanostructure involves the incorporation of carbon into the sulfide structure. For example, U.S. Pat. No. 4,528,089 teaches that the use of carbon-containing catalyst precursors gives more active catalysts than catalysts prepared from sulfide precursors without organic groups. Use of organic impregnation aids in preparing oxide catalyst precursors has also been studied for some time (Kotter, M.; Riekeft, L.; Weyland, F.; *Studies in Surface Science and Catalysis* (1983), 16 (Prep. Catal. 3), 521-30, and U.S. Pat. No. 3,975,302).

In U.S. Pat. No. 7,591,942, it was demonstrated that sulfiding a bulk bimetallic Ni (or Co)/Mo (or W) phase containing a surfactant amine (located within the crystalline lattice of the oxide phase) with a backbone containing at least 10 carbon atoms gave a catalyst comprising stacked layers of $MoS_2$ (or $WS_2$) having a reduced number of stacks as compared to that obtained by sulfiding the carbon-free bulk oxide. A similar result was reported for bulk ternary Ni—Mo—W catalysts in U.S. Pat. No. 7,544,632. Lower number of stacks are important, since they may imply the presence of smaller crystals of Mo/W sulfides, which in turn can result in a larger surface area available for catalysis.

U.S. Published Patent Application No. 2007/0072765 discloses a method for preparing a catalyst composition, which method comprises: (a) impregnating an inorganic catalyst support with an aqueous solution containing (i) a salt of a Group VIII metal selected from Co and Ni, (ii) a salt of a Group VI metal selected from Mo and W, and (iii) an effective amount of an organic agent selected from amino alcohols and amino acids; (b) drying the impregnated catalyst support to remove substantially all water, thereby resulting in a metal-organic component on support catalyst precursor; (c) calcining the substantially dried catalyst precursor in the presence of an oxygen-containing atmosphere under conditions to oxidize at least 30%, but not all, of the organic agent and produce a partially oxidized catalyst precursor containing carbon; and (d) sulfiding the partially oxidized catalyst precursor in the presence of a sulfiding agent to produce a sulfided catalyst composition. Again the sulfide catalyst composition is found to have a lower number of stacks than equivalent compositions produced without organics present in the precursor.

Other potentially relevant publications can include, but are not limited to, U.S. Pat. Nos. 6,989,348 and 6,280,610, European Patent Nos. 0601722, 1041133, and 0181035, and International Publication Nos. WO 96/41848, WO 95/31280, WO 00/41810, and WO 00/41811.

Although, reducing number of stacks can be important in increasing catalyst surface area, it is not, in itself, sufficient to maximize catalyst activity, since it does not necessarily ensure that the promoter atoms (e.g., Co, Ni) are properly located on the sulfide stacks. According to the present invention, a new bulk mixed metal oxide catalyst precursor composition is provided which, when sulfided, not only reduces the number of stacks of the sulfided product but also enhances the efficiency of the promoter metal, thereby resulting in a catalyst of improved hydroprocessing activity.

SUMMARY

As refineries are being forced to process crudes with larger amounts of sulfur and nitrogen, while at the same time environmental regulations are mandating lower levels of these heteroatoms in products, a need exists to synthesize catalysts that can do more efficient desulfurization and denitrogenation, particularly where existing units are limited in their pressure capability and/or more refractory feeds are desirable from a cost perspective. Since residual sulfur- and/or nitrogen-containing molecules can poison metal or acid sites on catalysts used downstream of the hydrotreating process (such as in hydrocrackers), improvements in the hydroprocessing feed pretreatment (e.g., to FCC and/or hydrocracking units) can have a large impact on how acid and/or metal catalysts operate. Alumina-supported Ni or Ni/Co-promoted molybdenum sulfides are the traditional catalysts used for hydrodenitrogenation (HDN) or hydrodesulfurization (HDS) at intermediate and relatively high pressures, and alumina-supported Co-promoted molybdenum sulfides are the traditional catalysts for HDS at relatively low pressures.

Improved modeling efforts have been underway worldwide to better understand the complex structure sensitivity of these metal sulfide catalysts. From a synthetic perspective, learning how to systematically control metal sulfide morphology remains a huge scientific and critically important technological challenge. For the layered structures of Group 6 (e.g., Mo and/or W) sulfides, this can involve considerations such as controlling lateral dimension, number of stacks in a crystallite, and properly siting the promoter atoms on the Group 6 sulfide stacks.

It is important to note that lower number of stacks, by itself, does generally indicate smaller sulfide crystallites, but it does not insure that the promoter atoms (Co or Ni) are properly located. It had been previously observed that substitution of a variety of inorganic components into a Group 6/Groups 8-10 (e.g., NiMo, NiMoW, and/or NiW) oxide precursor did not significantly change the nanostructure of the resulting bulk sulfide catalysts. Although bulk NiMoW catalysts perform hydroprocessing reactions well at relatively high pressures, there is still an opportunity to develop improved catalysts.

One advantage of incorporating organics in the preparation of the precursor according to the present invention can be that the density of the precursor tends to be substantially higher than when the organic is incorporated into the structure (whether crystalline or amorphous) of the oxide phase forming an oxide-organic hybrid. Without being bound by theory, when an oxide-organic hybrid phase is formed, the organic can take up "space" in the lattice of the hybrid phases, in some cases drastically reducing the density relative to the mixed metal oxide and/or further limiting the relative amount of inorganic constituents present in the phase. In most of the preparations described herein, the organic component is believed to be located in what were the empty pore spaces of the oxide phase, leaving the high density of the oxide phase substantially intact, and/or to be coordinated to the surface (—OH) groups of the oxide phase. Nonetheless the presence of certain organic compounds can significantly impact the crystallite size of sulfides generated from the precursors seen by the reduction in the number of stacks. Again without being bound by theory, an additional or alternate advantage of the processes of the present invention can be that the promoter metals from Groups 8-10 (e.g., Ni) appear to situate very well in respect to the host Group 6 sulfide phase.

Accordingly, one aspect of the present invention relates to a catalyst precursor composition comprising at least one metal from Group 6 of the Periodic Table of the Elements, at least one metal from Groups 8-10 of the Periodic Table of the Elements, and a reaction product formed from (i) a first organic compound containing at least one amine group and at least 10 carbons or (ii) a second organic compound containing at least one carboxylic acid group and at least 10 carbons, but not both (i) and (ii), wherein the reaction product contains additional unsaturated carbon atoms, relative to (i) the first organic compound or (ii) the second organic compound, wherein the metals of the catalyst precursor composition are arranged in a crystal lattice, and wherein the reaction product is not located within the crystal lattice. This catalyst precursor composition can be a bulk metal catalyst precursor composition or a supported metal catalyst precursor composition. When it is a bulk mixed metal catalyst precursor composition, the reaction product can be obtained by heating the composition (though specifically the amine-containing compound or the carboxylic acid-containing compound) to a temperature from about 195° C. to about 250° C. for a time sufficient for the first or second organic compounds to react to form additional in situ unsaturated carbon atoms not present in the first or second organic compounds, but not for so long that more than 50% by weight of the first or second organic compound is volatilized, thereby forming a catalyst precursor composition containing in situ formed unsaturated carbon atoms. Accordingly, a bulk mixed metal hydroprocessing catalyst composition can be produced from this bulk mixed metal catalyst precursor composition by sulfiding it under sufficient sulfidation conditions, which sulfidation should begin in the presence of the in situ amide (i.e., the amide should be substantially present, or not significantly decomposed, by the beginning of the sulfiding step).

Another aspect of the present invention relates to a process for producing a catalyst precursor composition containing in situ formed unsaturated carbon atoms, the process comprising: (a) treating a catalyst precursor composition comprising at least one metal from Group 6 of the Periodic Table of the Elements, at least one metal from Groups 8-10 of the Periodic Table of the Elements, with a first organic compound containing at least one amine group and at least 10 carbon atoms or a second organic compound containing at least one carboxylic acid group and at least 10 carbon atoms, to form an organically treated precursor catalyst composition; and (b) heating said organically treated precursor catalyst composition at a temperature from about 195° C. to about 250° C. for a time sufficient for the first or second organic compounds to react to form additional in situ unsaturated carbon atoms not present in the first or second organic compounds, but not for so long that more than 50% by weight of the first or second organic compound is volatilized, thereby forming a catalyst precursor composition containing in situ formed unsaturated carbon atoms. This process can be used to make a bulk metal catalyst precursor composition or a supported metal catalyst precursor composition. When used to make a bulk mixed metal catalyst precursor composition, catalyst precursor composition containing in situ formed unsaturated carbon atoms can, in one embodiment, consist essentially of the reaction product, an oxide form of the at least one metal from Group 6, an oxide form of the at least one metal from Groups 8-10, and optionally about 20 wt % or less of a binder.

Still another aspect of the present invention relates to a process for producing a sulfided hydroprocessing catalyst composition, which comprising sulfiding the catalyst precursor composition containing in situ formed unsaturated carbon atoms made according to any of the aforementioned processes described above or sulfiding any of the catalyst precursor compositions described above under sulfidation conditions sufficient to produce the sulfided hydroprocessing catalyst composition.

In an embodiment of any of the compositions and/or processes described above, the at least one metal from Group 6 can be Mo and/or W, and the at least one metal from Groups 8-10 can be Co and/or Ni. In another embodiment of any of the compositions and/or processes described above, the catalyst precursor composition can further comprise at least one metal from Group 5 of the Periodic Table of the Elements, for example V and/or Nb.

In an embodiment of any of the compositions and/or processes described above, the first organic compound comprise a primary monoamine having from 10 to 30 carbon atoms and/or the second organic compound can comprise only one carboxylic acid group and can have from 10 to 30 carbon atoms.

BRIEF DESCRIPTION OF THE DRAWINGS

FIGS. 16A-B show infrared data characterizing bulk catalysts having undergone treatments using two organic compounds at various temperatures and under various conditions.

DETAILED DESCRIPTION OF THE EMBODIMENTS

Figure 1:
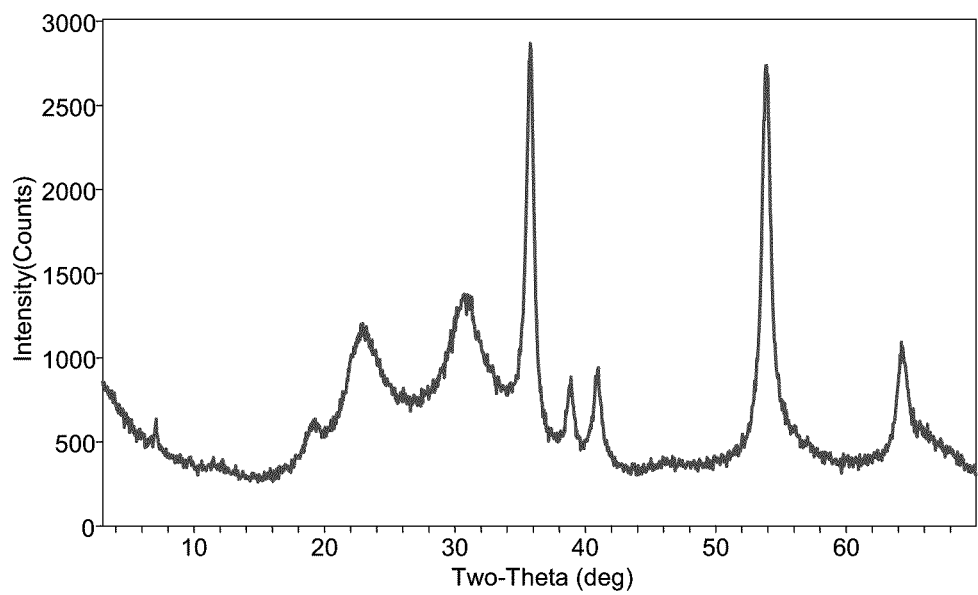
FIG. 1 shows an X-ray diffraction pattern of as-synthesized and dried hexagonal $NiWO_4$ catalyst precursor, produced according to Comparative Example 1.

One aspect of the present invention described herein relates to a catalyst precursor composition comprising at least one metal from Group 6 of the Periodic Table of the Elements, at least one metal from Groups 8-10 of the Periodic Table of the Elements, and a reaction product formed from (i) a first organic compound containing at least one amine group, or (ii) a second organic compound separate from said first organic compound and containing at least one carboxylic acid group, but not both (i) and (ii). When this reaction product contains additional unsaturation(s) not present in the first or second organic compounds, e.g., from at least partial decomposition/dehydrogenation at conditions including elevated temperatures, the presence of the additional unsaturation(s) in any intermediate or final composition can be determined by methods well known in the art, e.g., by FTIR and/or nuclear magnetic resonance ($^{13}$C NMR) techniques. This catalyst precursor composition can be a bulk metal catalyst precursor composition or a heterogeneous (supported) metal catalyst precursor composition.

More broadly, this aspect of the present invention relates to a catalyst precursor composition comprising at least one metal from Group 6 of the Periodic Table of the Elements, at least one metal from Groups 8-10 of the Periodic Table of the Elements, and a decomposition/dehydrogenation reaction product formed from at least partial decomposition of (i) a first organic compound containing at least one first functional group or (ii) a second organic compound separate from said first organic compound and containing at least one second functional group, but not both (i) and (ii), which decomposition/dehydrogenation reaction causes an additional unsaturation to form in situ in the reaction product.

As used herein, the term "bulk", when describing a mixed metal oxide catalyst composition, indicates that the catalyst composition is self-supporting in that it does not require a carrier or support. It is well understood that bulk catalysts may have some minor amount of carrier or support material in their compositions (e.g., about 20 wt % or less, about 15 wt % or less, about 10 wt % or less, about 5 wt % or less, or substantially no carrier or support, based on the total weight of the catalyst composition); for instance, bulk hydroprocessing catalysts may contain a minor amount of a binder, e.g., to improve the physical and/or thermal properties of the catalyst. In contrast, heterogeneous or supported catalyst systems typically comprise a carrier or support onto which one or more catalytically active materials are deposited, often using an impregnation or coating technique. Nevertheless, heterogeneous catalyst systems without a carrier or support (or with a minor amount of carrier or support) are generally referred to as bulk catalysts and are frequently formed by co-precipitation techniques.

When the catalyst precursor is a bulk mixed metal catalyst precursor composition, the reaction product can be obtained by heating the composition (though specifically the first or second organic compounds, or the amine-containing or carboxylic acid-containing compound) to a temperature from about 195° C. to about 250° C. for a time sufficient to effectuate a dehydrogenation, and/or an at least partial decomposition, of the first or second organic compound to form an additional unsaturation in the reaction product in situ. Accordingly, a bulk mixed metal hydroprocessing catalyst composition can be produced from this bulk mixed metal catalyst precursor composition by sulfiding it under sufficient sulfiding conditions, which sulfiding should begin in the presence of the in situ additionally unsaturated reaction product (which may result from at least partial decomposition, e.g., via oxidative dehydrogenation in the presence of oxygen and/or via non-oxidative dehydrogenation in the absence of an appropriate concentration of oxygen, of typically-unfunctionalized organic portions of the first or second organic compounds, e.g., of an aliphatic portion of an organic compound and/or through conjugation/aromatization of unsaturations expanding upon an unsaturated portion of an organic compound).

Catalyst precursor compositions and hydroprocessing catalyst compositions useful in various aspects of the present invention can advantageously comprise (or can have metal components that consist essentially of) at least one metal from Group 6 of the Periodic Table of Elements and at least one metal from Groups 8-10 of the Periodic Table of Elements, and optionally at least one metal from Group 5 of the Periodic Table of Elements. Generally, these metals are present in their substantially fully oxidized form, which can typically take the form of simple metal oxides, but which may be present in a variety of other oxide forms, e.g., such as hydroxides, oxyhydroxides, oxycarbonates, carbonates, oxynitrates, oxysulfates, or the like, or some combination thereof. In one preferred embodiment, the Group 6 metal(s) can be Mo and/or W, and the Group 8-10 metal(s) can be Co and/or Ni. Generally, the atomic ratio of the Group 6 metal(s) to the metal(s) of Groups 8-10 can be from about 2:1 to about 1:3, for example from about 5:4 to about 1:2, from about 5:4 to about 2:3, from about 5:4 to about 3:4, from about 10:9 to about 1:2, from about 10:9 to about 2:3, from about 10:9 to about 3:4, from about 20:19 to about 2:3, or from about 20:19 to about 3:4. When the composition further comprises at least one metal from Group 5, that at least one metal can be V and/or Nb. When present, the amount of Group 5 metal(s) can be such that the atomic ratio of the Group 6 metal(s) to the Group 5 metal(s) can be from about 99:1 to about 1:1, for example from about 99:1 to about 5:1, from about 99:1 to about 10:1, or from about 99:1 to about 20:1. Additionally or alternately, when Group 5 metal(s) is(are) present, the atomic ratio of the sum of the Group 5 metal(s) plus the Group (6) metal(s) compared to the metal(s) of Groups 8-10 can be from about 2:1 to about 1:3, for example from about 5:4 to about 1:2, from about 5:4 to about 2:3, from about 5:4 to about 3:4, from about 10:9 to about 1:2, from about 10:9 to about 2:3, from about 10:9 to about 3:4, from about 20:19 to about 2:3, or from about 20:19 to about 3:4.

As used herein, the numbering scheme for the Periodic Table Groups is as disclosed in *Chemical and Engineering News*, 63(5), 27 (1985).

The metals in the catalyst precursor compositions and in the hydroprocessing catalyst compositions according to the invention can be present in any suitable form prior to sulfiding, but can often be provided as metal oxides. When provided as bulk mixed metal oxides, such bulk oxide components of the catalyst precursor compositions and of the hydroprocessing catalyst compositions according to the invention can be prepared by any suitable method known in the art, but can generally be produced by forming a slurry, typically an aqueous slurry, comprising (1) (a) an oxyanion of the Group 6 metal(s), such as a tungstate and/or a molybdate, or (b) an insoluble (oxide, acid) form of the Group 6 metal(s), such as tungstic acid and/or molybdenum trioxide, (2) a salt of the Group 8-10 metal(s), such as nickel carbonate, and optionally, when present, (3) (a) a salt or oxyanion of a Group 5 metal, such as a vanadate and/or a niobate, or (b) insoluble (oxide, acid) form of a Group 5 metal, such as niobic acid and/or diniobium pentoxide. The slurry can be heated to a suitable temperature, such as from about 60° C. to about 150° C., at a suitable pressure, e.g., at atmospheric or autogenous pressure, for an appropriate time, e.g., about 4 hours to about 24 hours.

Non-limiting examples of suitable mixed metal oxide compositions can include, but are not limited to, nickel-tungsten oxides, cobalt-tungsten oxides, nickel-molybdenum oxides, cobalt-molybdenum oxides, nickel-molybdenum-tungsten oxides, cobalt-molybdenum-tungsten oxides, cobalt-nickel-tungsten oxides, cobalt-nickel-molybdenum oxides, cobalt-nickel-tungsten-molybdenum oxides, nickel-tungsten-niobium oxides, nickel-tungsten-vanadium oxides, cobalt-tungsten-vanadium oxides, cobalt-tungsten-niobium oxides, nickel-molybdenum-niobium oxides, nickel-molybdenum-vanadium oxides, nickel-molybdenum-tungsten-niobium oxides, nickel-molybdenum-tungsten-vanadium oxides, and the like, and combinations thereof.

Suitable mixed metal oxide compositions can advantageously exhibit a specific surface area (as measured via the nitrogen BET method using a Quantachrome Autosorb™ apparatus) of at least about 20 m$^2$/g, for example at least about 30 m$^2$/g, at least about 40 m$^2$/g, at least about 50 m$^2$/g, at least about 60 m$^2$/g, at least about 70 m$^2$/g, or at least about 80 m$^2$/g. Additionally or alternately, the mixed metal oxide compositions can exhibit a specific surface area of not more than about 500 m$^2$/g, for example not more than about 400 m$^2$/g, not more than about 300 m$^2$/g, not more than about 250 m$^2$/g, not more than about 200 m$^2$/g, not more than about 175 m$^2$/g, not more than about 150 m$^2$/g, not more than about 125 m$^2$/g, or not more than about 100 m$^2$/g.

After separating and drying the mixed metal oxide (slurry) composition, it can be treated, generally by impregnation, with (i) an effective amount of a first organic compound containing at least one amine group or (ii) an effective amount of a second organic compound separate from the first organic compound and containing at least one carboxylic acid group, but not both (i) and (ii).

In an embodiment of any of the compositions and/or processes described herein, the first organic compound can comprise at least 10 carbon atoms, for example can comprise from 10 to 20 carbon atoms or can comprise a primary monoamine having from 10 to 30 carbon atoms. Additionally or alternately, the second organic compound can comprise at least 10 carbon atoms, for example can comprise from 10 to 20 carbon atoms or can comprise only one carboxylic acid group and can have from 10 to 30 carbon atoms.

Representative examples of organic compounds containing amine groups can include, but are not limited to, primary and/or secondary, linear, branched, and/or cyclic amines, such as triacontanylamine, octacosanylamine, hexacosanylamine, tetracosanylamine, docosanylamine, erucylamine, eicosanylamine, octadecylamine, oleylamine, linoleylamine, hexadecylamine, sapienylamine, palmitoleylamine, tetradecylamine, myristoleylamine, dodecylamine, decylamine, nonylamine, cyclooctylamine, octylamine, cycloheptylamine, heptylamine, cyclohexylamine, n-hexylamine, isopentylamine, n-pentylamine, t-butylamine, n-butylamine, isopropylamine, n-propylamine, adamantanamine, adamantanemethylamine, pyrrolidine, piperidine, piperazine, imidazole, pyrazole, pyrrole, pyrrolidine, pyrroline, indazole, indole, carbazole, norbornylamine, aniline, pyridylamine, benzylamine, aminotoluene, alanine, arginine, aspartic acid, glutamic acid, glutamine, glycine, histidine, isoleucine, leucine, lysine, phenylalanine, serine, threonine, valine, 1-amino-2-propanol, 2-amino-1-propanol, diaminoeicosane, diaminooctadecane, diaminohexadecane, diaminotetradecane, diaminododecane, diaminodecane, 1,2-diaminocyclohexane, 1,3-diaminocyclohexane, 1,4-diaminocyclohexane, ethylenediamine, ethanolamine, p-phenylenediamine, o-phenylenediamine, m-phenylenediamine, 1,2-propylenediamine, 1,3-propylenediamine, 1,4-diaminobutane, 1,3diamino-2-propanol, and the like, and combinations thereof. In an embodiment, the molar ratio of the Group 6 metal(s) in the composition to the first organic compound during treatment can be from about 1:1 to about 20:1.

The amine functional group from the first organic compound can include primary or secondary amines, as mentioned above, but generally does not include quaternary amines, and in some instances does not include tertiary amines either. Furthermore, the first organic compound can optionally contain other functional groups besides amines. For instance, the first organic compound can comprise an aminoacid, which possesses an amine functional group and a carboxylic acid functional group simultaneously. Aside from carboxylic acids, other examples of such secondary functional groups in amine-containing organic compounds can generally include, but are not limited to, hydroxyls, aldehydes, anhydrides, ethers, esters, imines, imides, ketones, thiols (mercaptans), thioesters, and the like, and combinations thereof.

Additionally or alternately, the amine portion of the first organic compound can be a part of a larger functional group in that compound, so long as the amine portion (notably the amine nitrogen and the constituents attached thereto) retains its operability as a Lewis base. For instance, the first organic compound can comprise a urea, which functional group comprises an amine portion attached to the carbonyl portion of an amide group. In such an instance, the urea can be considered functionally as an "amine-containing" functional group for the purposes of the present invention herein, except in situations where such inclusion is specifically contradicted. Aside from ureas, other examples of such amine-containing functional groups that may be suitable for satisfying the at least one amine group in the first organic compound can generally include, but are not limited to, hydrazides, sulfonamides, and the like, and combinations thereof.

Representative examples of organic compounds containing carboxylic acids can include, but are not limited to, primary and/or secondary, linear, branched, and/or cyclic amines, such as triacontanoic acid, octacosanoic acid, hexacosanoic acid, tetracosanoic acid, docosanoic acid, erucic acid, docosahexanoic acid, eicosanoic acid, eicosapentanoic acid, arachidonic acid, octadecanoic acid, oleic acid, elaidic acid, stearidonic acid, linoleic acid, alpha-linolenic acid, hexadecanoic acid, sapienic acid, palmitoleic acid, tetradecanoic acid, myristoleic acid, dodecanoic acid, decanoic acid, nonanoic acid, cyclooctanoic acid, octanoic acid, cycloheptanoic acid, heptanoic acid, cyclohexanoic acid, hexanoic acid, adamantanecarboxylic acid, norbornaneacetic acid, benzoic acid, salicylic acid, acetylsalicylic acid, citric acid, maleic acid, malonic acid, glutaric acid, lactic acid, oxalic acid, tartaric acid, cinnamic acid, vanillic acid, succinic acid, adipic acid, phthalic acid, isophthalic acid, terephthalic acid, ethylenediaminetetracarboxylic acids (such as EDTA), fumaric acid, alanine, arginine, aspartic acid, glutamic acid, glutamine, glycine, histidine, isoleucine, leucine, lysine, phenylalanine, serine, threonine, valine, 1,2-cyclohexanedicarboxylic acid, 1,3-cyclohexanedicarboxylic acid, 1,4-cyclohexanedicarboxylic acid, and the like, and combinations thereof. In an embodiment, the molar ratio of the Group 6 metal(s) in the composition to the second organic compound during treatment can be from about 3:1 to about 20:1.

The second organic compound can optionally contain other functional groups besides carboxylic acids. For instance, the second organic compound can comprise an aminoacid, which possesses a carboxylic acid functional group and an amine functional group simultaneously. Aside from amines, other examples of such secondary functional groups in carboxylic acid-containing organic compounds can generally include, but are not limited to, hydroxyls, aldehydes, anhydrides, ethers, esters, imines, imides, ketones, thiols (mercaptans), thioesters, and the like, and combinations thereof. In some embodiments, the second organic compound can contain no additional amine or alcohol functional groups in addition to the carboxylic acid functional group(s).

Additionally or alternately, the reactive portion of the second organic compound can be a part of a larger functional group in that compound and/or can be a derivative of a carboxylic acid that behaves similarly enough to a carboxylic acid, such that the reactive portion and/or derivative retains its operability as a Lewis acid. One example of a carboxylic acid derivative can include an alkyl carboxylate ester, where the alkyl group does not substantially hinder (over a reasonable time scale) the Lewis acid functionality of the carboxylate portion of the functional group.

In certain embodiments, the organic compound(s)/additive(s) and/or the reaction product(s) are not located/incorporated within the crystal lattice of the mixed metal oxide precursor composition, e.g., instead being located on the surface and/or within the pore volume of the precursor composition and/or being associated with (bound to) one or more metals or oxides of metals in a manner that does not significantly affect the crystalline lattice of the mixed metal oxide precursor composition, as observed through XRD and/or other crystallographic spectra. It is noted that, in these certain embodiments, a sulfided version of the mixed metal oxide precursor composition can still have its sulfided form affected by the organic compound(s)/additive(s) and/or the reaction product(s), even though the oxide lattice is not significantly affected.

One way to attain a catalyst precursor composition containing a decomposition/dehydrogenation reaction product, such as one containing additional unsaturations, includes: (a) treating a catalyst precursor composition, which comprises at least one metal from Group 6 of the Periodic Table of the Elements and at least one metal from Groups 8-10 of the Periodic Table of the Elements, with a first organic compound containing at least one amine group or a second organic compound separate from said first organic compound and containing at least one carboxylic acid group, but not both, to form an organically treated precursor catalyst composition; and (b) heating the organically treated precursor catalyst composition at a temperature sufficient and for a time sufficient for the first or second organic compounds to react to form an in situ product containing additional unsaturation (for example, depending upon the nature of the first or second organic compound, the temperature can be from about 195° C. to about 250° C., such as from about 200° C. to about 230° C.), thereby forming the additionally-unsaturated catalyst precursor composition.

In certain advantageous embodiments, the heating step (b) above can be conducted for a sufficiently long time so as to form additional unsaturation(s), which may result from at least partial decomposition (e.g., oxidative and/or non-oxidative dehydrogenation and/or aromatization) of some (typically-unfunctionalized organic) portions of the first or second organic compounds, but generally not for so long that the at least partial decomposition volatilizes more than 50% by weight of the first or second organic compounds. Without being bound by theory, it is believed that additional unsaturation(s) formed in situ and present at the point of sulfiding the catalyst precursor composition to form a sulfided (hydroprocessing) catalyst composition can somehow assist in controlling one or more of the following: the size of sulfided crystallites; the coordination of one or more of the metals during sulfidation, such that a higher proportion of the one or more types of metals are in appropriate sites for promoting desired hydroprocessing reactions (such as hydrotreating, hydrodenitrogenation, hydrodesulfurization, hydrodeoxygenation, hydrodemetallation, hydrocracking including selective hydrocracking, hydroisomerization, hydrodewaxing, and the like, and combinations thereof, and/or for reducing/minimizing undesired hydroprocessing reactions, such as aromatic saturation, hydrogenation of double bonds, and the like, and combinations thereof) than for sulfided catalysts made in the absence of the in situ formed reaction product having additional unsaturation(s); and coordination/catalysis involving one or more of the metals after sulfidation, such that a higher proportion (or each) of the one or more types of metals are more efficient at promoting desired hydroprocessing reactions (e.g., because the higher proportion of metal sites can catalyze more hydrodesulfurization reactions of the same type in a given timescale and/or because the higher proportion of the metal sites can catalyze more difficult hydrodesulfurization reactions in a similar timescale) than for sulfided catalysts made in the absence of the in situ formed reaction product having additional unsaturation(s).

When used to make a bulk mixed metal catalyst precursor composition, the in situ reacted catalyst precursor composition can, in one embodiment, consist essentially of the reaction product, an oxide form of the at least one metal from Group 6, an oxide form of the at least one metal from Groups 8-10, and optionally about 20 wt % or less of a binder (e.g., about 10 wt % or less).

After treatment of the catalyst precursor containing the at least one Group 6 metal and the at least one Group 8-10 metal with the first or second organic compounds, the organically treated catalyst precursor composition can be heated to a temperature high enough to form the reaction product and optionally but preferably high enough to enable any dehydrogenation/decomposition byproduct to be easily removed (e.g., in order to drive the reaction equilibrium to the at least partially dehydrogenated/decomposed product). Additionally or alternately, the organically treated catalyst precursor composition can be heated to a temperature low enough so as to substantially retain the reaction product (containing the additional unsaturations), so as not to significantly decompose the reaction product, and/or so as not to significantly volatilize (more than 50% by weight of) the first or second organic compounds (whether reacted or not).

It is contemplated that the specific lower and upper temperature limits based on the above considerations can be highly dependent upon a variety of factors that can include, but are not limited to, the atmosphere under which the heating is conducted, the chemical and/or physical properties of the first organic compound, the second organic compound, the reaction product, and/or any reaction byproduct, or a combination thereof. In one embodiment, the heating temperature can be at least about 120° C., for example at least about 150° C., at least about 165° C., at least about 175° C., at least about 185° C., at least about 195° C., at least about 200° C., at least about 210° C., at least about 220° C., at least about 230° C., at least about 240° C., or at least about 250° C. Additionally or alternately, the heating temperature can be not greater than about 400° C., for example not greater than about 375° C., not greater than about 350° C., not greater than about 325° C., not greater than about 300° C., not greater than about 275° C., not greater than about 250° C., not greater than about 240° C., not greater than about 230° C., not greater than about 220° C., not greater than about 210° C., or not greater than about 200° C.

In one embodiment, the heating can be conducted in a low- or non-oxidizing atmosphere (and conveniently in an inert atmosphere, such as nitrogen). In an alternate embodiment, the heating can be conducted in a moderately- or highly-oxidizing environment. In another alternate embodiment, the heating can include a multi-step process in which one or more heating steps can be conducted in the low- or non-oxidizing atmosphere, in which one or more heating steps can be conducted in the moderately- or highly-oxidizing environment, or both. Of course, the period of time for the heating in the environment can be tailored to the first or second organic compound, but can typically extend from about 5 minutes to about 168 hours, for example from about 10 minutes to about 96 hours, from about 10 minutes to about 48 hours, from about 10 minutes to about 24 hours, from about 10 minutes to about 18 hours, from about 10 minutes to about 12 hours, from about 10 minutes to about 8 hours, from about 10 minutes to about 6 hours, from about 10 minutes to about 4 hours, from about 20 minutes to about 96 hours, from about 20 minutes to about 48 hours, from about 20 minutes to about 24 hours, from about 20 minutes to about 18 hours, from about 20 minutes to about 12 hours, from about 20 minutes to about 8 hours, from about 20 minutes to about 6 hours, from about 20 minutes to about 4 hours, from about 30 minutes to about 96 hours, from about 30 minutes to about 48 hours, from about 30 minutes to about 24 hours, from about 30 minutes to about 18 hours, from about 30 minutes to about 12 hours, from about 30 minutes to about 8 hours, from about 30 minutes to about 6 hours, from about 30 minutes to about 4 hours, from about 45 minutes to about 96 hours, from about 45 minutes to about 48 hours, from about 45 minutes to about 24 hours, from about 45 minutes to about 18 hours, from about 45 minutes to about 12 hours, from about 45 minutes to about 8 hours, from about 45 minutes to about 6 hours, from about 45 minutes to about 4 hours, from about 1 hour to about 96 hours, from about 1 hour to about 48 hours, from about 1 hour to about 24 hours, from about 1 hour to about 18 hours, from about 1 hour to about 12 hours, from about 1 hour to about 8 hours, from 1 hour minutes to about 6 hours, or from about 1 hour to about 4 hours.

In an embodiment, the organically treated catalyst precursor composition and/or the catalyst precursor composition containing the reaction product can contain from about 4 wt % to about 20 wt %, for example from about 5 wt % to about 15 wt %, carbon resulting from the first and second organic compounds and/or from the condensation product, as applicable, based on the total weight of the relevant composition.

Additionally or alternately, as a result of the heating step, the reaction product from the organically treated catalyst precursor can exhibit a content of unsaturated carbon atoms (which includes aromatic carbon atoms), as measured according to peak area comparisons using $^{13}C$ NMR techniques, of at least 29%, for example at least about 30%, at least about 31%, at least about 32%, or at least about 33%. Further additionally or alternately, the reaction product from the organically treated catalyst precursor can optionally exhibit a content of unsaturated carbon atoms (which includes aromatic carbon atoms), as measured according to peak area comparisons using $^{13}C$ NMR techniques, of up to about 70%, for example up to about 65%, up to about 60%, up to about 55%, up to about 50%, up to about 45%, up to about 40%, or up to about 35%. Still further additionally or alternately, as a result of the heating step, the reaction product from the organically treated catalyst precursor can exhibit an increase in content of unsaturated carbon atoms (which includes aromatic carbon atoms), as measured according to peak area comparisons using $^{13}C$ NMR techniques, of at least about 17%, for example at least about 18%, at least about 19%, at least about 20%, or at least about 21% (e.g., in an embodiment where the first organic compound is oleylamine and the second organic compound is oleic acid, such that the combined unsaturation level of the unreacted compounds is about 11.1% of carbon atoms, a ~17% increase in unsaturated carbons upon heating corresponds to about 28.1% content of unsaturated carbon atoms in the reaction product). Yet further additionally or alternately, the reaction product from the organically treated catalyst precursor can optionally exhibit an increase in content of unsaturated carbon atoms (which includes aromatic carbon atoms), as measured according to peak area comparisons using $^{13}C$ NMR techniques, of up to about 60%, for example up to about 55%, up to about 50%, up to about 45%, up to about 40%, up to about 35%, up to about 30%, or up to about 25%.

Again further additionally or alternately, as a result of the heating step, the reaction product from the organically treated catalyst precursor can exhibit a ratio of unsaturated carbon atoms to aromatic carbon atoms, as measured according to peak area ratios using infrared spectroscopic techniques of a deconvoluted peak centered from about 1700 $cm^{-1}$ to about 1730 $cm^{-1}$ (e.g., at about 1715 $cm^{-1}$), compared to a deconvoluted peak centered from about 1380 $cm^{-1}$ to about 1450 $cm^{-1}$ (e.g., from about 1395 $cm^{-1}$ to about 1415 $cm^{-1}$), of at least 0.9, for example at least 1.0, at least 1.1, at least 1.2, at least 1.3, at least 1.4, at least 1.5, at least 1.7, at least 2.0, at least 2.2, at least 2.5, at least 2.7, or at least 3.0. Again still further additionally or alternately, the reaction product from the organically treated catalyst precursor can exhibit a ratio of unsaturated carbon atoms to aromatic carbon atoms, as measured according to peak area ratios using infrared spectroscopic techniques of a deconvoluted peak centered from about 1700 cm$^{-1}$ to about 1730 cm$^{-1}$ (e.g., at about 1715 cm$^{-1}$), compared to a deconvoluted peak centered from about 1380 cm$^{-1}$ to about 1450 cm$^{-1}$ (e.g., from about 1395 cm$^{-1}$ to about 1415 cm$^{-1}$), of up to 15, for example up to 10, up to 8.0, up to 7.0, up to 6.0, up to 5.0, up to 4.5, up to 4.0, up to 3.5, or up to 3.0.

A (sulfided) hydroprocessing catalyst composition can then be produced by sulfiding the catalyst precursor composition containing the reaction product. Sulfiding is generally carried out by contacting the catalyst precursor composition containing the reaction product with a sulfur-containing compound (e.g., elemental sulfur, hydrogen sulfide, polysulfides, or the like, or a combination thereof, which may originate from a fossil/mineral oil stream, from a biocomponent-based oil stream, from a combination thereof, or from a sulfur-containing stream separate from the aforementioned oil stream(s)) at a temperature and for a time sufficient to substantially sulfide the composition and/or sufficient to render the sulfided composition active as a hydroprocessing catalyst. For instance, the sulfidation can be carried out at a temperature from about 300° C. to about 400° C., e.g., from about 310° C. to about 350° C., for a period of time from about 30 minutes to about 96 hours, e.g., from about 1 hour to about 48 hours or from about 4 hours to about 24 hours. The sulfiding can generally be conducted before or after combining the metal (oxide) containing composition with a binder, if desired, and before or after forming the composition into a shaped catalyst. The sulfiding can additionally or alternately be conducted in situ in a hydroprocessing reactor. Obviously, to the extent that a reaction product of the first or second organic compounds contains additional unsaturations formed in situ, it would generally be desirable for the sulfidation (and/or any catalyst treatment after the organic treatment) to significantly maintain the in situ formed additional unsaturations of said reaction product.

The sulfided catalyst composition can exhibit a layered structure comprising a plurality of stacked YS$_2$ layers, where Y is the Group 6 metal(s), such that the average number of stacks (typically for bulk organically treated catalysts) can be from about 1.5 to about 3.5, for example from about 1.5 to about 3.0, from about 2.0 to about 3.3, from about 2.0 to about 3.0, or from about 2.1 to about 2.8. For instance, the treatment of the metal (oxide) containing precursor composition according to the invention can afford a decrease in the average number of stacks of the treated precursor of at least about 0.8, for example at least about 1.0, at least about 1.2, at least about 1.3, at least about 1.4, or at least about 1.5, as compared to an untreated metal (oxide) containing precursor composition. As such, the number of stacks can be considerably less than that obtained with an equivalent sulfided mixed metal (oxide) containing precursor composition produced without the first or second organic compound treatment. The reduction in the average number of stacks can be evidenced, e.g., via X-ray diffraction spectra of relevant sulfided compositions, in which the (002) peak appears significantly broader (as determined by the same width at the half-height of the peak) than the corresponding peak in the spectrum of the sulfided mixed metal (oxide) containing precursor composition produced without the organic treatment (and/or, in certain cases, with only a single organic compound treatment using an organic compound having less than 10 carbon atoms) according to the present invention. Additionally or alternately to X-ray diffraction, transmission electron microscopy (TEM) can be used to obtain micrographs of relevant sulfided compositions, including multiple microcrystals, within which micrograph images the multiple microcrystals can be visually analyzed for the number of stacks in each, which can then be averaged over the micrograph visual field to obtain an average number of stacks that can evidence a reduction in average number of stacks compared to a sulfided mixed metal (oxide) containing precursor composition produced without the organic treatment (and/or, in certain cases, with only a single organic compound treatment) according to the present invention.

The sulfided catalyst composition described above can be used as a hydroprocessing catalyst, either alone or in combination with a binder. If the sulfided catalyst composition is a bulk catalyst, then only a relatively small amount of binder may be added. However, if the sulfided catalyst composition is a heterogeneous/supported catalyst, then usually the binder is a significant portion of the catalyst composition, e.g., at least about 40 wt %, at least about 50 wt %, at least about 60 wt %, or at least about 70 wt %; additionally or alternately for heterogeneous/supported catalysts, the binder can comprise up to about 95 wt % of the catalyst composition, e.g., up to about 90 wt %, up to about 85 wt %, up to about 80 wt %, up to about 75 wt %, or up to about 70 wt %. Non-limiting examples of suitable binder materials can include, but are not limited to, silica, silica-alumina (e.g., conventional silica-alumina, silica-coated alumina, alumina-coated silica, or the like, or a combination thereof), alumina (e.g., boehmite, pseudo-boehmite, gibbsite, or the like, or a combination thereof), titania, zirconia, cationic clays or anionic clays (e.g., saponite, bentonite, kaoline, sepiolite, hydrotalcite, or the like, or a combination thereof), and mixtures thereof. In some preferred embodiments, the binder can include silica, silica-alumina, alumina, titania, zirconia, and mixtures thereof. These binders may be applied as such or after peptization. It may also be possible to apply precursors of these binders that, during precursor synthesis, can be converted into any of the above-described binders. Suitable precursors can include, e.g., alkali metal aluminates (alumina binder), water glass (silica binder), a mixture of alkali metal aluminates and water glass (silica-alumina binder), a mixture of sources of a di-, tri-, and/or tetravalent metal, such as a mixture of water-soluble salts of magnesium, aluminum, and/or silicon (cationic clay and/or anionic clay), chlorohydrol, aluminum sulfate, or mixtures thereof.

Generally, the binder material to be used can have lower catalytic activity than the remainder of the catalyst composition, or can have substantially no catalytic activity at all (less than about 5%, based on the catalytic activity of the bulk catalyst composition being about 100%). Consequently, by using a binder material, the activity of the catalyst composition may be reduced. Therefore, the amount of binder material to be used, at least in bulk catalysts, can generally depend on the desired activity of the final catalyst composition. Binder amounts up to about 25 wt % of the total composition can be suitable (when present, from above 0 wt % to about 25 wt %), depending on the envisaged catalytic application. However, to take advantage of the resulting unusual high activity of bulk catalyst compositions according to the invention, binder amounts, when added, can generally be from about 0.5 wt % to about 20 wt % of the total catalyst composition.

If desired in bulk catalyst cases, the binder material can be composited with a source of a Group 6 metal and/or a source of a non-noble Group 8-10 metal, prior to being composited with the bulk catalyst composition and/or prior to being added during the preparation thereof. Compositing the binder material with any of these metals may be carried out by any known means, e.g., impregnation of the (solid) binder material with these metal(s) sources.

A cracking component may also be added during catalyst preparation. When used, the cracking component can represent from about 0.5 wt % to about 30 wt %, based on the total weight of the catalyst composition. The cracking component may serve, for example, as an isomerization enhancer. Conventional cracking components can be used, e.g., a cationic clay, an anionic clay, a zeolite (such as ZSM-5, zeolite Y, ultra-stable zeolite Y, zeolite X, an AlPO, a SAPO, or the like, or a combination thereof), amorphous cracking components (such as silica-alumina or the like), or a combination thereof. It is to be understood that some materials may act as a binder and a cracking component at the same time. For instance, silica-alumina may simultaneously have both a cracking and a binding function.

If desired, the cracking component may be composited with a Group 6 metal and/or a Group 8-10 non-noble metal, prior to being composited with the catalyst composition and/or prior to being added during the preparation thereof. Compositing the cracking component with any of these metals may be carried out by any known means, e.g., impregnation of the cracking component with these metal(s) sources. When both a cracking component and a binder material are used and when compositing of additional metal components is desired on both, the compositing may be done on each component separately or may be accomplished by combining the components and doing a single compositing step.

The selection of particular cracking components, if any, can depend on the intended catalytic application of the final catalyst composition. For instance, a zeolite can be added if the resulting composition is to be applied in hydrocracking or fluid catalytic cracking. Other cracking components, such as silica-alumina or cationic clays, can be added if the final catalyst composition is to be used in hydrotreating applications. The amount of added cracking material can depend on the desired activity of the final composition and the intended application, and thus, when present, may vary from above 0 wt % to about 80 wt %, based on the total weight of the catalyst composition. In a preferred embodiment, the combination of cracking component and binder material can comprise less than 50 wt % of the catalyst composition, for example, less than about 40 wt %, less than about 30 wt %, less than about 20 wt %, less than about 15 wt %, or less than about 10 wt %.

If desired, further materials can be added, in addition to the metal components already added, such as any material that would be added during conventional hydroprocessing catalyst preparation. Suitable examples of such further materials can include, but are not limited to, phosphorus compounds, boron compounds, fluorine-containing compounds, sources of additional transition metals, sources of rare earth metals, fillers, or mixtures thereof.

The mixed metal oxide catalyst compositions described herein can be used ubiquitously in many hydroprocessing processes to treat any of a plurality of feeds under wide-ranging reaction conditions, such as temperatures from about 200° C. to about 450° C., hydrogen pressures from about 5 barg to about 300 barg (about 0.5 MPag to about 30 MPag), LHSVs from about 0.05 hr$^{-1}$ to about 10 hr$^{-1}$, and hydrogen treat gas rates from about 200 scf/bbl to about 10,000 scf/bbl (about 34 Nm$^3$/m$^3$ to about 1700 Nm$^3$/m$^3$). The term "hydroprocessing," as used herein, should be understood to encompass all processes in which a hydrocarbon feed is reacted with hydrogen (e.g., at the temperatures and pressures noted above), and specifically includes hydrodemetallation, hydrodewaxing, hydrotreating, hydrogenation, hydrodesulfurization, hydrodenitrogenation, hydrodearomatization, hydroisomerization, and hydrocracking (including selective hydrocracking), as well as combinations thereof. Depending on the type of hydroprocessing and the reaction conditions, the products of hydroprocessing may show improved viscosities, viscosity indices, saturate contents, low temperature properties, volatilities, depolarization, or the like, or combinations thereof. It should be understood that hydroprocessing can be practiced in one or more reaction zones, in either countercurrent flow or co-current flow mode. By countercurrent flow mode is meant a process mode in which the feedstream flows in a direction opposite to the flow of hydrogen-containing treat gas. The hydroprocessing reactor can also be operated in any suitable catalyst-bed arrangement mode (e.g., fixed bed, slurry bed, ebullating bed, or the like).

A wide range of hydrocarbon feedstocks can be hydroprocessed in accordance with the present invention. Suitable feedstocks can include, but are not limited to, whole and reduced petroleum crudes, atmospheric and vacuum residua, propane deasphalted residua (e.g., brightstock), cycle oils, FCC tower bottoms, gas oils (including atmospheric and vacuum gas oils, as well as coker gas oils), light to heavy distillates (including raw virgin distillates), hydrocrackates, hydrotreated oils, dewaxed oils, slack waxes, Fischer-Tropsch waxes, raffinates, naphthas, and the like, and combinations thereof. In particular, due to the increased activity of the catalysts made according to the invention, a particularly large advantage can be seen for hydrocarbon feedstocks that are more difficult to process, e.g., because of increased sulfur and/or nitrogen content and/or because of an increased content of particularly difficult sulfur and/or nitrogen content, which can typically include, but is not limited to, heavier and more disadvantaged feeds, such as gasoils, heavy distillates (including diesel), cycle oils, FCC tower bottoms, waxes, residua, certain whole or heavier reduced petroleum crudes, and the like, and combinations thereof.

Additionally or alternately, the hydrocarbon feedstock can include renewable or biofeed in the form of lipid material, so long as there is sufficient sulfur content in the feedstock to implicate the use of hydroprocessing catalysts such as those described herein. The term "lipid material," as used herein, is a composition comprised of biological materials. Generally, these biological materials include vegetable fats/oils, animal fats/oils, fish oils, pyrolysis oils, and algae lipids/oils, as well as components of such materials. More specifically, the lipid material includes one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used include, but are not limited to, rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from about 2 wt % to about 40 wt % of lipids, based on total weight of the biomass itself.

Algal sources for algae oils include, but are not limited to, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*.

Additionally or alternately, non-limiting examples of microalgae can include, for example, *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella*, and *Volvox* species, including freshwater and marine microalgal species of these or other genera.

Further additionally or alternately, the algae used according to the invention can be characterized as cyanobacteria. Non-limiting examples of cyanobacteria can include, for example, *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema*, and *Xenococcus* species, including freshwater and marine cyanobacterial species of these or other genera.

One way to judge the effectiveness of the treatment with the first or second organic compounds on the catalyst precursor compositions according to the invention can be based on relative catalytic activity for a given reaction process (e.g., hydrodenitrogenation, hydrodesulfurization, hydrodeoxygenation, or the like). Such relative catalytic activity can further be expressed by comparing standard catalyst characteristics, such as weight, volume, moles of a certain (active metal) component, or the like, to normalize the results for universal comparison amongst catalysts useful in that given reaction process. Even so, such standard characteristics may not be universally comparable—for example, because supported catalysts tend to have most of their catalytically active metal sites spread out over the support surface (and thus available for catalyzation), comparison of relative activities between supported catalysts and bulk catalysts may be inappropriate or uninformative, since proportionally fewer of the catalytically active metal sites in a bulk catalyst are disposed on the surface (and thus available for catalyzation). Nevertheless, amongst catalysts of similar type (e.g., Group 6/Group 8-10 bulk catalysts), relative catalytic activity can be a particularly useful comparison. In the instant case, unless otherwise stated, relative volumetric activity (RVA), which normalizes activity herein to a unit volume based on catalyst loading and catalyst density, and relative molar activity (RMA), which normalizes activity herein to the collective number of moles of non-Group 8-10 catalytically active metal(s), are based on hydrodenitrogenation (HDN) reactions, assuming ~1.0 order kinetics. For RMA values, the non-Group 8-10 catalytically active metal(s) includes any and all Group 6 catalytically active metal(s) (e.g., Mo and/or W), as well as other catalytically active metal(s) such as Group 5 (e.g., Nb and/or V). All the RMA values herein were taken from experiments where catalyst was "on stream" (i.e., contacting the feed at reaction conditions such as hydroprocessing reaction conditions) for between about 10 days and about 30 days, and RMA values were only reported when they appeared to stabilize.

As a result, one characterization of the compositions, methods of making such compositions, and methods of use according to the present invention, additionally or alternately to one or more others described herein, can include an increase in RMA for catalyst compositions containing a reaction product of first or second organic compounds (but not both) and/or in methods containing an organic treatment using first or second organic compounds (but not both) according to the invention of at least 25%, compared to catalyst compositions without, or prior to, an organic treatment using first or second organic compounds and/or methods containing no, or prior to any, organic treatment; for example, the RMA increase can be at least 30%, at least 32%, at least 34%, at least 36%, at least 38%, at least 40%, at least 42%, at least 44%, at least 46%, at least 48%, at least 50%, at least 51%, at least 52%, at least 53%, at least 54%, or at least 55%. Additionally or alternately, the RMA increase can be up to 200%, for example up to 150%, up to 125%, up to 100%, up to 90%, up to 80%, up to 70%, up to 65%, up to 60%, up to 57%, up to 56%, up to 55%, up to 54%, up to 53%, up to 52%, up to 51%, or up to 50%, compared to catalyst compositions without, or prior to, an organic treatment using first or second organic compounds (but not both) and/or methods containing no, or prior to any, organic treatment. Further additionally or alternatively, the compositions, methods of making such compositions, and methods of use according to the present invention, can exhibit an increase in RMA for catalyst compositions containing a reaction product of first or second organic compounds (but not both) and/or in methods containing an organic treatment using first or second organic compounds (but not both) according to the invention of at least 20%, compared to catalyst compositions with an organic treatment using only a single organic compound having less than 10 carbon atoms and/or to methods containing an organic treatment using only a single organic compound having less than 10 carbon atoms; for example, the RMA increase can be at least 25%, at least 30%, at least 35%, at least 40%, at least 45%, at least 46%, at least 47%, at least 48%, at least 49%, at least 50%, at least 51%, at least 52%, at least 53%, at least 54%, at least 55%, at least 60%, at least 65%, at least 70%, at least 75%, at least 80%, or at least 85%. Still further additionally or alternatively, the RMA increase can be up to 200%, for example up to 150%, up to 125%, up to 100%, up to 90%, up to 80%, up to 70%, up to 65%, up to 60%, up to 57%, up to 56%, up to 55%, up to 54%, up to 53%, up to 52%, up to 51%, or up to 50%, compared to compared to catalyst compositions with an organic treatment using only a single organic compound having less than 10 carbon atoms and/or to methods containing an organic treatment using only a single organic compound having less than 10 carbon atoms.

Additionally or alternatively, the present invention can include the following embodiments.

Embodiment 1

A catalyst precursor composition comprising at least one metal from Group 6 of the Periodic Table of the Elements, at least one metal from Groups 8-10 of the Periodic Table of the Elements, and a reaction product formed from (i) a first organic compound containing at least one amine group and at least 10 carbons or (ii) a second organic compound containing at least one carboxylic acid group and at least 10 carbons, but not both (i) and (ii), wherein the reaction product contains additional unsaturated carbon atoms, relative to (i) the first organic compound or (ii) the second organic compound, wherein the metals of the catalyst precursor composition are arranged in a crystal lattice, and wherein the reaction product is not located within the crystal lattice.

Embodiment 2

A process for producing a catalyst precursor composition containing in situ formed unsaturated carbon atoms, the process comprising: (a) treating a catalyst precursor composition comprising at least one metal from Group 6 of the Periodic Table of the Elements, at least one metal from Groups 8-10 of the Periodic Table of the Elements, with a first organic compound containing at least one amine group and at least 10 carbon atoms or a second organic compound containing at least one carboxylic acid group and at least 10 carbon atoms, to form an organically treated precursor catalyst composition; and (b) heating said organically treated precursor catalyst composition at a temperature from about 195° C. to about 250° C. for a time sufficient for the first or second organic compounds to react to form additional in situ unsaturated carbon atoms not present in the first or second organic compounds, but not for so long that more than 50% by weight of the first or second organic compound is volatilized, thereby forming a catalyst precursor composition containing in situ formed unsaturated carbon atoms.

Embodiment 3

The catalyst precursor composition or the process of any one of the previous embodiments, wherein said at least one metal from Group 6 is Mo, W, or a combination thereof, and wherein said at least one metal from Groups 8-10 is Co, Ni, or a combination thereof.

Embodiment 4

The catalyst precursor composition or the process of any one of the previous embodiments, wherein said catalyst precursor composition further comprises at least one metal from Group 5 of the Periodic Table of the Elements, for example V, Nb, or a combination thereof.

Embodiment 5

The catalyst precursor composition or the process of any one of the previous embodiments, wherein said first organic compound comprises a primary monoamine having from 10 to 30 carbon atoms, and/or wherein said second organic compound comprises only one carboxylic acid group and has from 10 to 30 carbon atoms.

Embodiment 6

A bulk mixed metal catalyst precursor composition produced by heating the composition of any one of embodiments 1 and 3-5 to a temperature from about 195° C. to about 250° C. for a time sufficient for the first or second organic compounds to form a reaction product in situ that contains unsaturated carbon atoms not present in the first or second organic compounds.

Embodiment 7

A bulk mixed metal hydroprocessing catalyst composition produced by sulfiding the catalyst precursor composition of embodiment 6.

Embodiment 8

The process of any one of embodiments 2-5, wherein the catalyst precursor composition containing in situ formed unsaturated carbon atoms is a bulk metal hydroprocessing catalyst precursor composition consisting essentially of the reaction product, an oxide form of the at least one metal from Group 6, an oxide form of the at least one metal from Groups 8-10, and optionally about 20 wt % or less of a binder.

Embodiment 9

A process for producing a sulfided hydroprocessing catalyst composition, comprising sulfiding the catalyst precursor composition containing in situ formed unsaturated carbon atoms made according to the process of any one of embodiments 2-5 and 8 under conditions sufficient to produce the sulfided hydroprocessing catalyst composition.

Embodiment 10

A catalyst precursor composition containing in situ formed unsaturated carbon atoms made according to the process of any one of embodiments 2-5 and 8-9.

Embodiment 11

A sulfided hydroprocessing catalyst composition made according to the process of embodiment 10.

Embodiment 12

The catalyst precursor composition, the hydroprocessing catalyst, or the process of any one of the previous embodiments, wherein one or more of the following are satisfied: the catalyst precursor composition exhibits a content of unsaturated carbon atoms, as measured according to peak area comparisons using $^{13}C$ NMR techniques, of at least 29%; the catalyst precursor composition exhibits an increase in content of unsaturated carbon atoms, as measured according to peak area comparisons using $^{13}C$ NMR techniques, of at least about 17%, compared to a collective content of unsaturated carbon atoms present in the first or second organic compound; the catalyst precursor composition exhibits a ratio of unsaturated carbon atoms to aromatic carbon atoms, as measured according to peak area ratios using infrared spectroscopic techniques of a deconvoluted peak centered from about 1700 $cm^{-1}$ to about 1730 $cm^{-1}$, compared to a deconvoluted peak centered from about 1380 $cm^{-1}$ to about 1450 $cm^{-1}$, of at least 0.9; and the catalyst precursor composition exhibits a ratio of unsaturated carbon atoms to aromatic carbon atoms, as measured according to peak area ratios using infrared spectroscopic techniques of a deconvoluted peak centered from about 1700 $cm^{-1}$ to about 1730 $cm^{-1}$, compared to a deconvoluted peak centered from about 1380 $cm^{-1}$ to about 1450 $cm^{-1}$, of up to 15.

Embodiment 13

A process for producing a sulfided hydroprocessing catalyst composition, comprising sulfiding the catalyst precursor composition of any one of embodiments 1, 3-6, 10, and 12 or made according to the process of any one of embodiments 2-5, 8-9, and 12 under conditions sufficient to produce the sulfided hydroprocessing catalyst composition, wherein one or more of the following are satisfied: the sulfided hydroprocessing catalyst composition exhibits a layered structure comprising a plurality of stacked layers of sulfided Group 6 metal(s), such that the average number of stacked layers is from about 1.5 to about 3.5; the sulfided hydroprocessing catalyst composition exhibits a layered structure comprising a plurality of stacked layers of sulfided Group 6 metal(s), such that the average number of stacked layers is at least about 0.8 stacked layers less than an identical sulfided hydroprocessing catalyst composition that has not been treated using first or second organic compounds; upon exposure of the sulfided hydroprocessing catalyst composition to a vacuum gasoil feedstock under hydroprocessing conditions, the sulfided hydroprocessing catalyst composition exhibits a hydrodenitrogenation RMA of at least 57% greater than a sulfided catalyst composition that has not been treated using first or second organic compounds; upon exposure of the sulfided hydroprocessing catalyst composition to a vacuum gasoil feedstock under hydroprocessing conditions, the sulfided hydroprocessing catalyst composition exhibits a hydrodenitrogenation RMA of up to 500% greater than a sulfided catalyst composition that has not been treated using first or second organic compounds; upon exposure of the sulfided hydroprocessing catalyst composition to a vacuum gasoil feedstock under hydroprocessing conditions, the sulfided hydroprocessing catalyst composition exhibits a hydrodenitrogenation RMA at least 30% greater than a sulfided catalyst composition that has been treated with only a single organic compound having less than 10 carbon atoms; and upon exposure of the sulfided hydroprocessing catalyst composition to a vacuum gasoil feedstock under hydroprocessing conditions, the sulfided hydroprocessing catalyst composition exhibits a hydrodenitrogenation RMA up to 500% greater than a sulfided catalyst composition that has been treated with only a single organic compound having less than 10 carbon atoms.

The invention will now be more particularly described with reference to the accompanying drawings and the following non-limiting Examples.

EXAMPLES

In the Examples, X-ray diffraction spectra were collected on a Rigaku Dmax diffractometer with Cu $K_\alpha$ radiation. Thermogravimetry, Dynamic Thermal Analysis, and Mass Spectrometry (TG/DTA/MS) data were collected on a Mettler TGA 851 thermal balance, interfaced with a Balzers Thermostar quadrupole mass spectrometer, which was equipped with a secondary electron multiplier. Weight loss during air oxidation at about 800° C. was monitored both before and after the thermal treatment of the organically treated catalyst precursor to estimate the amount of organic components present in the sample. Also, the sulfided phases can be oxidized to form oxides (a weight loss event), thus allowing estimation of additional weight loss due to retention of the organic component in the sulfide phase.

For TEM measurements, samples of the sulfided compositions were crushed into pieces (less than about 100 nm thick), dusted onto holey-carbon coated grids, and examined in a bright field imaging mode of a Philips CM200F instrument. About 250-350 different crystals of each sulfided composition were examined, and the numbers of stacks were counted and averaged. Numbers of stacks reported herein are thus average values.

Sulfiding of the different catalyst precursors produced in the Examples was conducted by placing about 2-4 grams of the precursor in either the dried or calcined state in a quartz boat, which in turn was inserted into a horizontal quartz tube and placed into a Lindberg furnace. While still at room temperature, a flow of about 200 $cm^3$/min of about 10% $H_2S/H_2$ was admitted for about 15 minutes, and then the temperature was raised to about 400° C. in about 45 minutes with the ~10% $H_2S/H_2$ still flowing at about 200 $cm^3$/min This flow was continued for about 2 hours at about 400° C. The sample was then cooled in flowing ~10% $H_2S/H_2$ to about room temperature (about 20-25° C.) and held there for about 30 minutes at roughly the same flow. After about 300 $cm^3$/min of $N_2$ flow for about 30 minutes, a passivation gas comprising about 1% $O_2$ in He was introduced at about 50 $cm^3$/min at about room temperature and was left overnight (about 12-18 hours). The sample was then removed from the furnace.

Preparation Examples

Comparative Example 1

Preparation of $NiWO_4$ and $NiMo_{0.5}W_{0.5}O_4$ (No Organics)

A metastable hexagonal variant of $NiWO_4$ is formed by a solid-slurry reaction between nickel carbonate and tungstic acid. About 5.93 grams nickel carbonate and about 12.49 grams tungstic acid were added to about 150 mL of water to form a suspension, which was added to a ~275 mL Weflon™ reaction vessel. The vessel was then heated (in a microwave oven) to about 150° C. for about 6 hours, cooled to about room temperature (about 20-25° C.), and filtered and dried at about 100° C. After drying, the material was heated in a box furnace in air at a ramp rate of about 2° C./min up to a final temperature of about 300° C. and was held at that temperature for about 4 hours (e.g., to calcine). A portion of this material was labeled as catalyst A. FIG. 1 shows the x-ray diffraction spectrum of this sample, which crystallized in the hexagonal nickel tungstate phase. The $Ni_1Mo_{0.5}W_{0.5}O_4$ catalyst, catalyst B, was prepared in an analogous method, but half the moles of tungstic acid were replaced with $MoO_3$.

Example 1

Preparation of $NiWO_4(1,2DACH)_2$ and $NiWO_4(1,2DACH)_2$/(Citric Acid)

Figure 2:
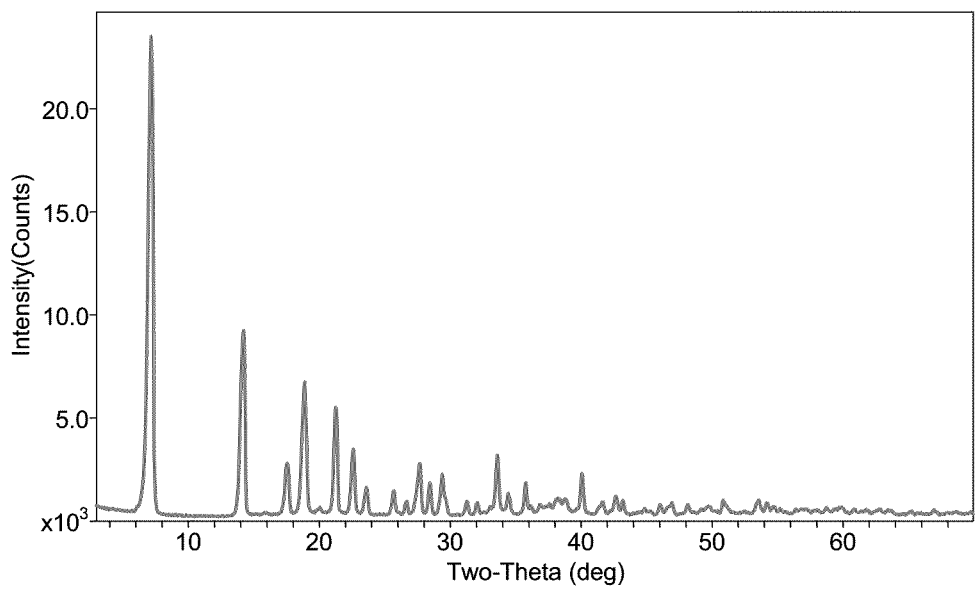
FIG. 2 shows an X-ray diffraction pattern of as-synthesized and dried $NiWO_4(1,2\text{-diaminocyclohexane})_2$ catalyst precursor, produced according to Example 1.

Into a ~1000 cc glass reaction flask equipped with a reflux condenser, about 16.6 grams nickel carbonate (~0.14 moles Ni) and about 35.0 grams tungstic acid (~0.14 moles W) were added to about 150 mL of water, into which about 32.0 grams 1,2-diaminocyclohexane (1,2DACH; ~0.28 moles, technical grade, Aldrich) had been previously dissolved. A stiffer, thermometer, and reflux condenser was attached to the flask. The reaction mixture was continuously stirred and heated to about 90° C. and held overnight (about 18 hours). The solid so obtained was filtered and dried at about 100° C. The weight obtained, about 39.5 g, compares with a calculated weight of about 74.9 g. The X-ray diffraction spectrum of the dried product is shown in FIG. 2 and was labeled as catalyst 1a.

A portion of catalyst 1a [$NiWO_4(1,2DACH)_2$] was treated in a flowing nitrogen stream (about 200 cm³/min) in a quartz line tube furnace, with a heating rate of about 2° C./min, to a final temperature of about 320° C. and was held at that temperature for about 90 minutes. It was then cooled to approximately room temperature and removed from the furnace. This catalyst was labeled as catalyst 1a//$N_2$. Another portion of catalyst 1a was impregnated (by incipient wetness) with citric acid such that the molar ratio of tungsten to citric acid was about 1:0.33. This sample was dried at about 100° C. overnight and labeled as catalyst 1b. A portion of catalyst 1b was treated in a flowing nitrogen stream (about 200 cm³/min) in a quartz line tube furnace, with a heating rate of about 2° C./min, to a final temperature of about 320° C. and was held at that temperature for about 90 minutes. It was then cooled to approximately room temperature and removed from the furnace. This catalyst was labeled as catalyst 1b//$N_2$.

Example 2

Preparation of $NiWO_4(ethylenediamine)_3$

Figure 3:
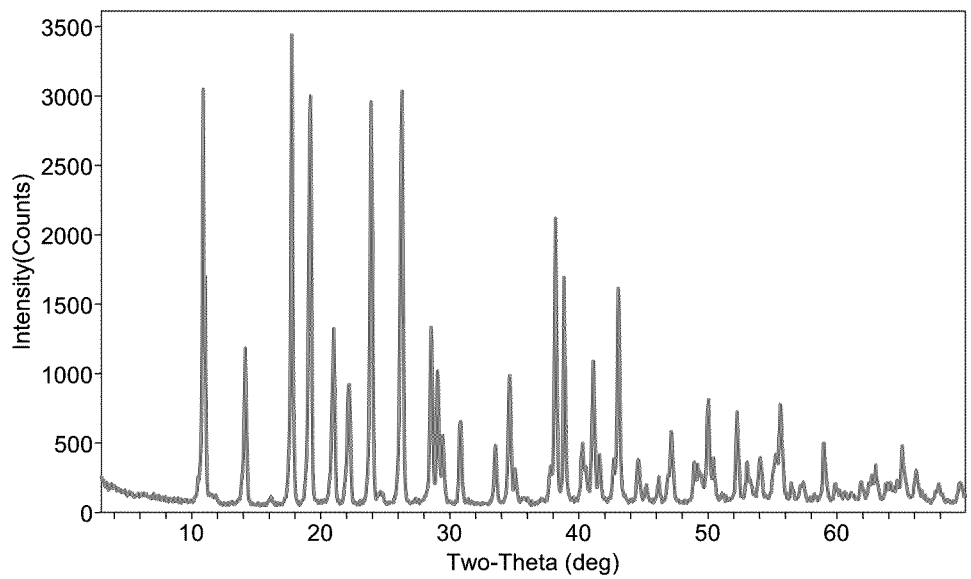
FIG. 3 shows an X-ray diffraction pattern of as-synthesized and dried $NiWO_4(\text{ethylenediamine})_3$ catalyst precursor, produced according to Example 2.

A tris-ethylenediamine complex of $NiWO_4$ was prepared by the reaction of about 5.94 grams nickel carbonate, about 12.49 grams tungstic acid, and about 9.02 grams ethylenediamine, all placed along with about 10 mL water into a ~275 mL Weflon™ reaction vessel. The vessel was sealed and the reaction mixture continuously stirred and heated at about 10° C./min to about 60° C. (in a microwave reactor) and was held at that temperature for about 6 hours. After cooling and filtering, about 9.4 grams of the known phase of the tris-ethylenediamine nickel tungstate was identified and labeled catalyst 2. FIG. 3 shows the X-ray diffraction pattern of this phase.

Example 3

Preparation of $NiWO_4/(en)_1$/Citric Acid$_{0.33}$/$N_2$

The $NiWO_4$ precursor produced in Comparative Example 1 was impregnated with ethylenediamine (en), such that the mole ratio of tungsten to en was about 1:1. A portion of this sample was labeled catalyst 3a. Another portion of catalyst 3a was treated in a flowing nitrogen stream (about 200 cm³/min) in a quartz line tube furnace, with a heating rate of about 2° C./min, to a final temperature of about 320° C. and was held at that temperature for about 90 minutes. It was then cooled to approximately room temperature and removed from the furnace. This catalyst was labeled as catalyst 3a//$N_2$.

The portion of the catalyst 3a that had been impregnated with en and dried at about 100° C. was then further impregnated (to the incipient wetness point) with citric acid dissolved in water, such that the molar ratio of en to citric acid was about 1:0.33. This sample was then dried again at about 100° C. and labeled as catalyst 3b. A portion of this catalyst 3b sample was treated in a flowing nitrogen stream (about 200 cm³/min) in a quartz-lined tube furnace, with a heating rate of about 2° C./min, to a final temperature of about 320° C. and was held at that temperature for about 90 minutes. It was then cooled to approximately room temperature and removed from the furnace. It was labeled as catalyst 3b//$N_2$.

A separate portion of the $NiWO_4$ was impregnated with only citric acid, such that the molar ratio of tungsten to citric acid was about 1:0.33. This portion was then dried at about 100° C. and labeled as catalyst 3c. A portion of catalyst 3c was treated in a flowing nitrogen stream (about 200 cm³/min) in a quartz-lined tube furnace, with a heating rate of about 2° C./min, to a final temperature of about 320° C. and was held at that temperature for about 90 minutes. It was then cooled to approximately room temperature and removed from the furnace. It was labeled as catalyst 3c//$N_2$.

Figure 4:
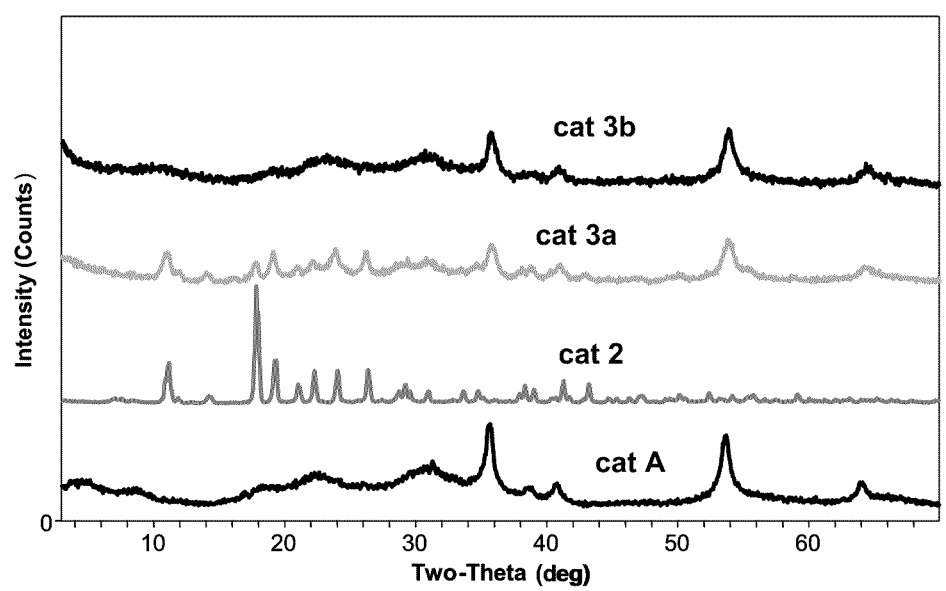
FIG. 4 shows X-ray diffraction patterns of the $NiWO_4$ catalyst precursor of Comparative Example 1, the $NiWO_4$ (ethylenediamine)$_3$ catalyst precursor of Example 2, and the $NiWO_4/(\text{en})_1$ and $NiWO_4/(\text{en})_1/\text{citric acid}_{0.33}$ catalyst precursors of Example 3.

FIG. 4 shows X-ray diffraction spectra of catalysts 3a and 3b and, by comparison, the X-ray diffraction spectra of catalysts A and 2a. This Figure shows the partial conversion of the $NiWO_4$ hexagonal nickel tungstate oxide precursor phase upon addition of ethylenediamine to form tris-ethylenediamine nickel tungstate phase (catalyst 3a compared to catalyst A), and the subsequent reversion of this phase on citric acid impregnation (catalyst 3b) to the nickel tungstate oxide phase (catalyst 2a).

Figure 5:
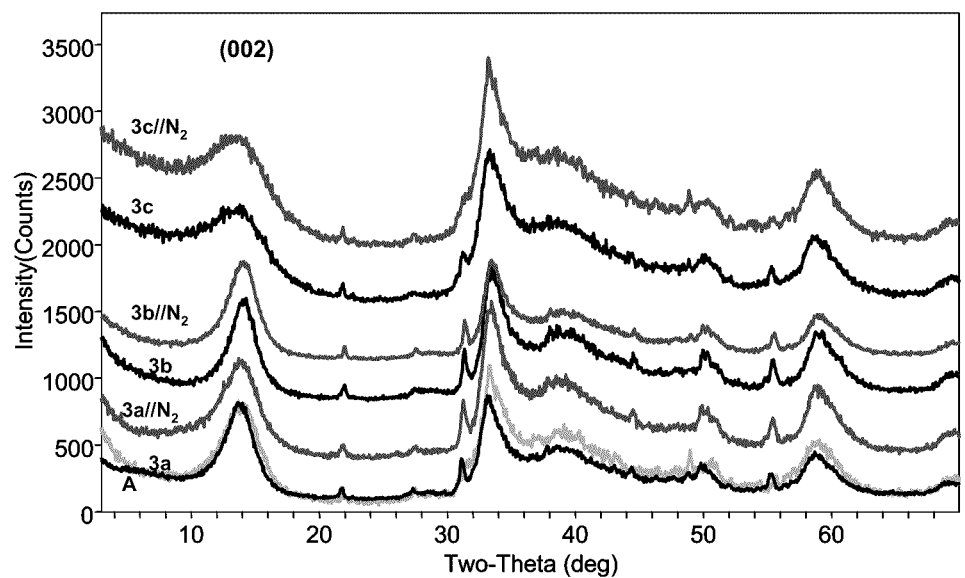
FIG. 5 shows X-ray diffraction patterns of the sulfided $NiWO_4$ catalyst of Comparative Example 1, as well as sulfided $NiWO_4/(\text{en})_1$, sulfided $NiWO_4/(\text{en})_1/\text{citric acid}_{0.33}$, and sulfided $NiWO_4/\text{citric acid}_{0.33}$ catalysts of Example 3, with and without prior $N_2$ treatment at about 320° C.

FIG. 5 shows the X-ray diffraction spectra of catalysts 3a, 3a//$N_2$, 3b, 3b//$N_2$, 3c, and 3c//$N_2$ after sulfidation, according to the protocol described above, together with the X-ray diffraction spectrum of the sulfided $NiWO_4$ catalyst of Comparative Example 1 (indicated as A). FIG. 5 shows that the (002) peak of the sulfide prepared from the neat oxide, the oxide impregnated with either en or citric alone, and the latter two with inert high temperature treatment were all approximately equally sharp (i.e., they appear to have roughly the same width at half-height for the (002) reflection as the neat oxide precursor (6)). The sharpness of the (002) peak is believed to correlate with increasing number of stacks (and thus crystallite size) of tungsten sulfide. Clearly the sample with both the en and citric acid together exhibited a much broader (002) peak, whether with or without the high temperature $N_2$ treatment.

Example 4

Preparation of NiWO$_4$/Citric Acid$_{0.33}$/(en)$_1$/N$_2$ and NiWO$_4$/Citric Acid$_{0.33}$ Plus (en)$_1$/N$_2$ As in Example 3, the same hexagonal nickel tungstate oxide precursor (catalyst A) was used. The NiWO$_4$ was then impregnated with an aqueous solution of citric acid, such that the molar ratio of tungsten to citric acid was about 1:0.33. This sample was then dried at about 100° C., after which ethylenediamine (en, dissolved in water) was added (by incipient wetness) to a portion of this sample, such that the molar ratio of en to citric acid was about 1:0.33 and such that the molar ratio of tungsten to en was about 1:1. This sample was then dried again at about 100° C. and labeled as catalyst 4a. A portion of catalyst 4a was treated in a flowing nitrogen stream (about 200 cm$^3$/min) in a quartz-lined tube furnace, with a heating rate of about 2° C./min, to a final temperature of about 320° C. and was held at that temperature for about 90 minutes. It was then cooled to approximately room temperature and removed from the furnace. It was labeled as catalyst 4a//N$_2$.

A separate catalyst sample was prepared by combining the aqueous citric acid solution with ethylenediamine and by impregnating this solution (in two incipient wetness steps) onto a portion of catalyst A, with drying in air at about 100° C. after each impregnation step. It was labeled as catalyst 4b. A portion of this sample was treated in a flowing nitrogen stream (about 200 cm$^3$/min) in a quartz-lined tube furnace, with a heating rate of about 2° C./min, to a final temperature of about 320° C. and was held at that temperature for about 90 minutes. It was then cooled to approximately room temperature and removed from the furnace. It was labeled as catalyst 4b//N$_2$.

Figure 6:
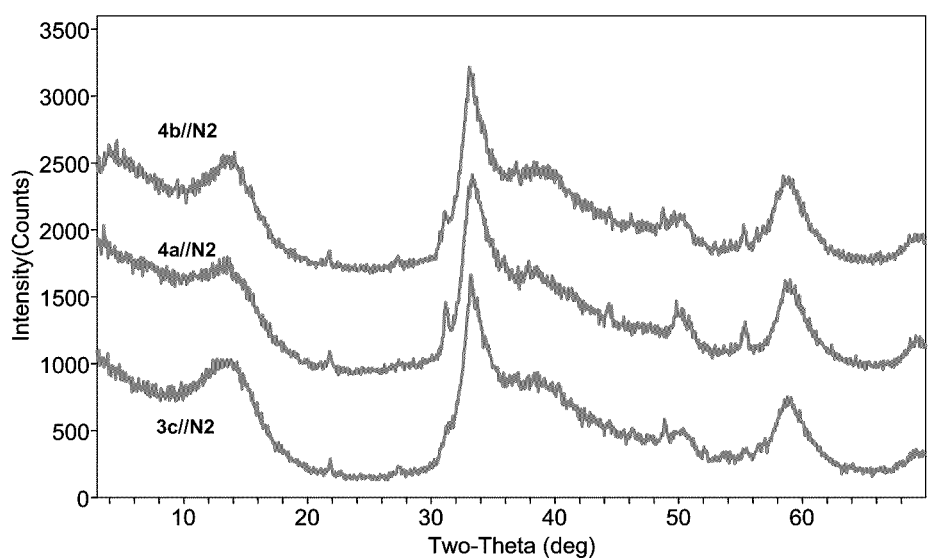
FIG. 6 shows X-ray diffraction patterns of the sulfided NiWO$_4$/(en)$_1$/citric acid$_{0.33}$ catalyst of Example 3 and sulfided NiWO$_4$/citric acid$_{0.33}$/(en)$_1$ and sulfided NiWO$_4$/citric acid$_{0.33}$ plus (en)$_1$ catalysts of Example 4.

Portions of catalysts 4a//N$_2$ and 4b//N$_2$ were sulfided according to the protocol described above. The X-ray diffraction spectra of the sulfided samples of catalysts 4a//N$_2$ and 4b//N$_2$ were compared to the spectrum of sulfided catalyst 3b//N$_2$ in FIG. 6. FIG. 6 shows that, irrespective of whether the diamine impregnation is effected before, after, or simultaneously with the organic acid impregnation, there appears to be a similar broadening of the (002) peak.

Example 5

Preparation of Other Organic Promoted NiWO$_4$ Precursors

A variety of other samples, each containing both (i) a diamine or an alkanolamine and (ii) an organic acid, impregnated onto the NiWO$_4$ oxide of Comparative Example 1 were prepared in a manner analogous to the description in Example 3. In each case, the amine was impregnated first, using the tungsten/amine mole ratio indicated in Table 1, followed by drying at about 100° C., then a second impregnation of the organic acid, another drying at about 100° C., and then inert nitrogen treatment at about 320° C.

TABLE 1

| Sample No. | Amine | W/amine mole ratio | Organic acid | W/acid mole ratio |
|---|---|---|---|---|
| 5a//N$_2$ | ethanolamine | ~1 | citric acid | ~0.33 |
| 5b//N$_2$ | o-phenylenediamine | ~1 | citric acid | ~0.33 |
| 5c//N$_2$ | 1,4-diaminocyclohexane | ~1 | citric acid | ~0.33 |

TABLE 1-continued

| Sample No. | Amine | W/amine mole ratio | Organic acid | W/acid mole ratio |
|---|---|---|---|---|
| 5d//N$_2$ | 1,2-propylenediamine | ~1 | citric acid | ~0.33 |
| 5e//N$_2$ | 1,2-diaminocyclohexane | ~1 | citric acid | ~0.33 |

Several other samples, each containing both (i) a monoamine or a diamine and (ii) an organic acid, impregnated onto the NiWO$_4$ oxide of Comparative Example 1 were prepared in a manner analogous to the description in Example 3. In each case, the amine was impregnated first, using the tungsten/amine mole ratio indicated in Table 2, followed by drying at about 100° C., then a second impregnation of the organic acid, another drying at about 100° C., and then inert nitrogen treatment at about 320° C.

TABLE 2

| Sample No. | Amine | W/amine mole ratio | Organic acid | W/acid mole ratio |
|---|---|---|---|---|
| 5f//N$_2$ | n-propylamine | ~1 | citric acid | ~0.33 |
| 5g//N$_2$ | Cyclohexylamine | ~1 | citric acid | ~0.33 |
| 5h//N$_2$ | 1,3-propylenediamine | ~1 | citric acid | ~0.33 |

Figure 7:
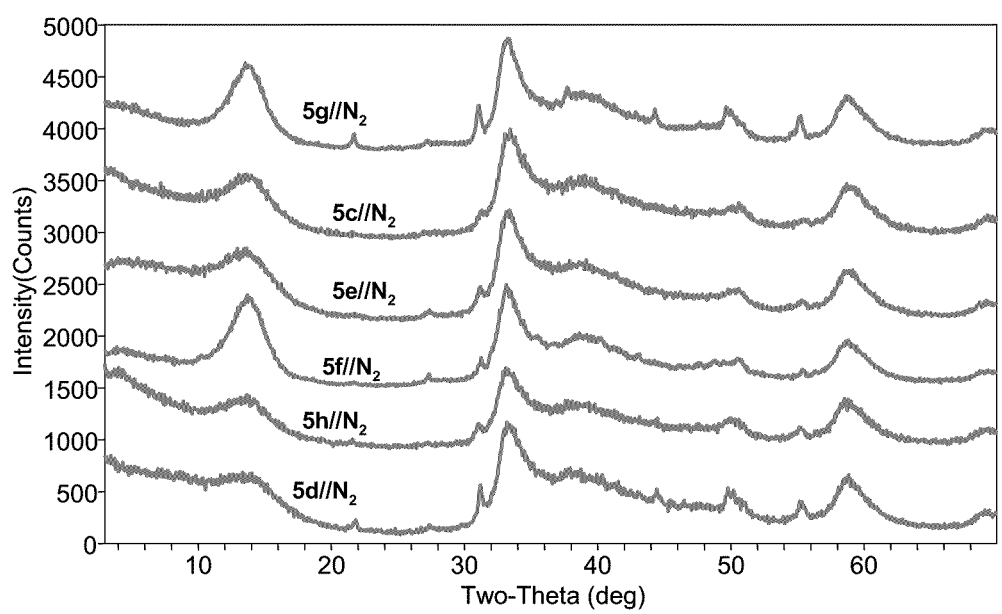
FIG. 7 shows X-ray diffraction patterns of sulfided catalysts prepared from the amine and organic acid impregnated NiWO$_4$ precursors of Example 5.

Certain of the precursors shown in Tables 1 and 2 were sulfided as described above, and the X-ray diffraction spectra of the resultant sulfides are shown in FIG. 7. It can be seen that the sulfides prepared from the monoamine precursors (propylamine and cyclohexylamine; 5f and 5g respectively) exhibited sharper (002) peaks (at about 12-14 degrees 2Θ). This indicated larger numbers of stacks than in the sulfides prepared with the diamines, regardless of whether the diamine was capable of forming bidentate coordinations (e.g., 1,2-propylenediamine and 1,2-diaminocyclohexane) or not (e.g., 1,3-propylenediamine and 1,4-diaminocyclohexane).

Several further samples containing both amine and organic acids impregnated onto the NiWO$_4$ oxide were also prepared in a manner analogous to the description in Example 3. These were prepared to compare the behavior of different organic acids in the preparations. In each of these cases, the diamine was impregnated first, using the tungsten/amine mole ratio indicated in Table 3, followed by drying at about 100° C., then a second impregnation of the organic acid, another drying at about 100° C., and then inert nitrogen treatment at about 320° C. The precursors were sulfided as described above.

TABLE 3

| Sample No. | Diamine | W/diamine mole ratio | Organic acid | W/acid mole ratio |
|---|---|---|---|---|
| 5k//N$_2$ | ethylenediamine | ~1 | maleic acid | ~0.50 |
| 5l//N$_2$ | ethylenediamine | ~1.5 | maleic acid | ~0.75 |
| 5m//N$_2$ | 1,2-propylenediamine | ~1.5 | maleic acid | ~0.75 |

Example 6

Preparation of Organic Promoted NiW$_{0.975}$Nb$_{0.25}$O$_4$ Precursors

Figure 8:
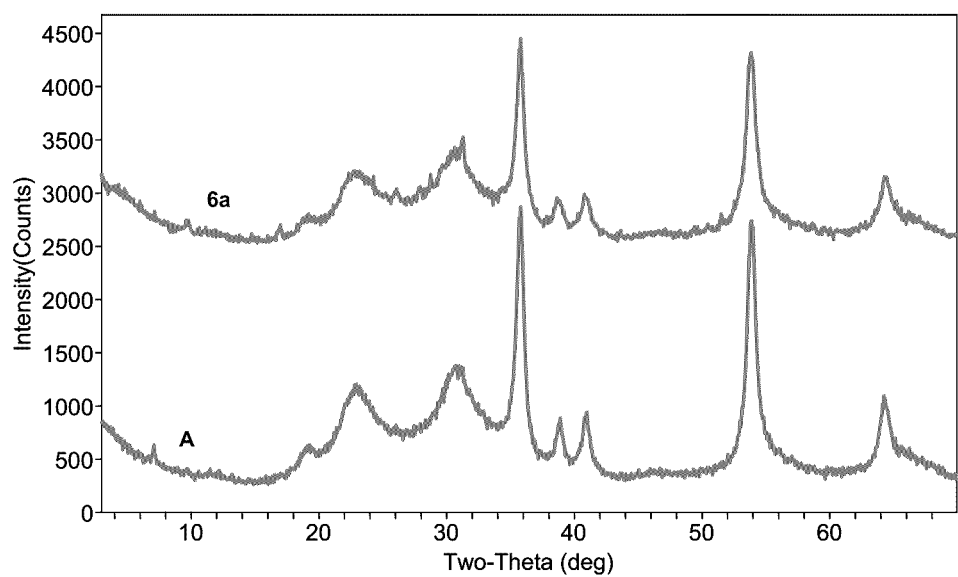
FIG. 8 compares X-ray diffraction patterns of the NiW$_{0.975}$Nb$_{0.025}$O$_4$ catalyst precursor produced according to Example 6 and the NiWO$_4$ catalyst precursor produced according to Comparative Example 1.

A different oxide precursor was used to prepare the dual promoted catalysts. A sample of approximate nominal composition NiW$_{0.975}$Nb$_{0.025}$O$_4$ was synthesized in a manner similar to the preparation of NiWO$_4$ described in Comparative Example 1, except that about 2.5 mol % of the tungsten component (tungstic acid) was substituted with the appropriate molar amount of niobic acid. The X-ray diffraction spectrum of the resulting product was nearly identical to the material without Nb, as shown in FIG. 8. The oxidic catalyst precursor containing Nb was designated as catalyst 6a. A portion of catalyst 6a was impregnated sequentially with ethylenediamine and then citric acid, such that the mole ratios were as follows: [W+Nb]/en of about 1:1 and [W+Nb]/citric acid of about 1:0.33. The resultant product was then treated in an inert nitrogen stream in the manner described in Example 3 and was labeled as catalyst 6b//$N_2$.

Example 7

Preparation of Organic Promoted $CoW_{0.5}V_{0.5}O_4$ Precursors

Figure 9:
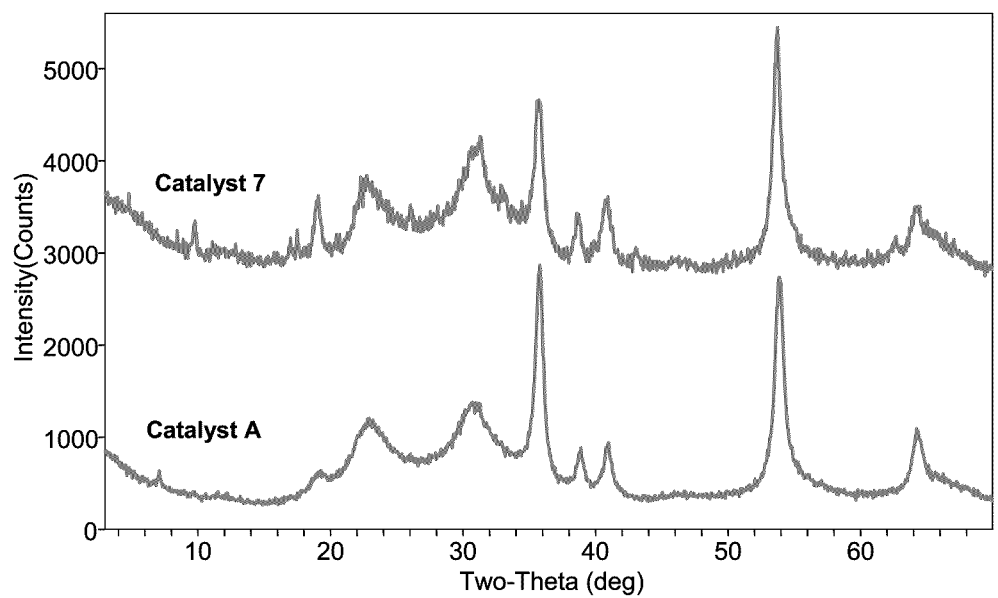
FIG. 9 compares X-ray diffraction patterns of the CoW$_{0.5}$V$_{0.5}$O$_4$ catalyst precursor produced according to Example 7 and the NiWO$_4$ catalyst precursor produced according to Comparative Example 1.

A sample of approximate nominal composition $Co_1W_{0.5}V_{0.5}$ oxide was prepared by reacting about 7.93 grams cobalt carbonate (about 0.067 moles Co), about 3.03 grams vanadium oxide ($V_2O_5$; about 0.033 moles V), and about 8.33 grams tungstic acid (about 0.033 moles W) in a water suspension of about 150 mL, while heating to about 150° C. for about 8 hours. The resulting phase, identified as catalyst 7, exhibited an x-ray diffraction pattern shown in FIG. 9, where it is compared to the pattern for $NiWO_4$ of Comparative Example 1 (and also shown in FIG. 13). A portion of catalyst 7 was used as the host oxide for sequentially impregnation of ethylenediamine and then citric acid in a manner analogous to the description in Example 3. The molar ratio of [W+V] to en was about 1:1, and the molar ratio of [W+V] to citric acid was about 1:0.33. The samples were dried in air at about 100° C. after each of the two impregnation steps, thus forming catalyst 7a. A portion of the catalyst 7a sample was then treated in a flowing nitrogen stream (about 200 cm³/min) in a quartz-lined tube furnace, with a heating rate of about 2° C./min, to a final temperature of about 360° C. and was held at that temperature for about 90 minutes. It was then cooled to approximately room temperature and removed from the furnace. It was labeled as catalyst 7a//$N_2$.

TESTING EXAMPLES

In Comparative Example 2 and Examples 8-14, catalyst activity results were obtained using a batch high-pressure reactor unit. The batch reactor was initially charged with about 65 µl of catalyst and about 1.85 ml of sulfiding feed. A partially hydrotreated distillate feed (about 570 ppm sulfur content and about 350 ppm nitrogen content) was used for sulfiding the catalyst. Catalyst sulfiding was done at about 315° C. and at about 400 psig (about 2.9 MPag) using a hydrogen gas mixture containing about 10% $H_2S$ for about 30 hours. The batch reactor assembly was orbitally shaken to ensure good mixing of the gas, liquid, and catalyst. Following sulfiding, the spent feed was removed by de-pressurizing the reactor and cooling the reactor assembly to ambient conditions (approximately room temperature, or about 20-25° C.). To minimize air exposure, the feed removal and dispensing was performed inside a glove box kept under a nitrogen atmosphere. Catalyst performance was then evaluated by charging a fresh (1.85 ml) load of vacuum gas oil (VGO) feed. The reactor was then pressurized to about 650 psig (about 4.6 MPag) with ~100% $H_2$ and heated to about 357° C. (about 675° F.). The reaction was progressed for a total duration of about 24 hours, following which the reactor was de-pressurized and cooled to ambient conditions. The product liquid was sampled and analyzed for total nitrogen content using an Antek™ analyzer. In any given run, around 2-3 blank reactors loaded only with feed (no catalyst) were also tested to set a baseline that was further used for calculating the actual catalyst activity. Because of the difficulty of accurately dispensing the low volume of the solid catalysts, each catalyst was weighed on an analytical balance, and the relative weight activities were determined using these weights.

The approximate nominal composition of the VGO used for the activity measurements in Examples 8-14 is shown in Table 4 below:

TABLE 4

| | |
|---|---|
| Gravity, API | ~21.4 |
| Sulfur, wt % | ~2.617 |
| Nitrogen, wppm | ~1005 |
| Basic Nitrogen, wppm | ~270 |
| Carbon, wt % | ~86.0 |
| Hydrogen, wt % | ~9.6 |
| Nickel, wppm | ~0.23 |
| Vanadium, wppm | ~0.64 |
| ConCarbon, wt % | ~0.9 |
| GC Distillation (wt %), ° F. | |
| IBP | ~520 |
| 5 | ~632 |
| 10 | ~671 |
| 20 | ~727 |
| 30 | ~769 |
| 40 | ~805 |
| 50 | ~842 |
| 60 | ~883 |
| 70 | ~934 |
| 80 | ~1003 |
| 90 | ~1074 |
| 95 | ~1119 |
| FBP | ~1225 |
| Saturates, wt % | ~41.7 |
| 1-Ring Aromatics, wt % | ~18.3 |
| 2-Ring Aromatics, wt % | ~19.4 |
| 3-Ring Aromatics, wt % | ~12.1 |
| 4-Ring Aromatics, wt % | ~6.5 |
| Polars, wt % | ~2.1 |

Based on the liquid product analysis for N using the Antek™ analyzer, the catalyst performance was expressed in terms of relative weight activity (RWA) with respect to a reference catalyst. The RWA for a given catalyst was then calculated using the equation below:

$$RWA = [\ln(C^{blank}/C^{final})/(Cat.\ wt.)]/[\ln(C^{blank}/C^{final})/(Cat.\ wt.)]_{Ref}$$

where $C^{blank}$ represents the concentration (wppm) of total nitrogen in the product liquid from a blank reactor after the activity run is complete, where $C^{final}$ represents the final concentration of total nitrogen (wppm) in the product liquid from a reactor containing the catalyst, and where Cat. wt. represents the weight of the specific volume of the catalyst dispensed. The reference catalyst used for all the runs reported was a relatively high activity catalyst made from an oxide (only) catalyst precursor of approximate stoichiometry $NiMo_{0.5}W_{0.5}O_4$ (see catalyst B of Comparative Example 1).

Comparative Example 2

Testing of Catalysts of Comparative Example 1

The hydrodenitrogenation (HDN) activity of a sulfided sample of catalyst A (bulk $NiWO_4$ with no organics present) for the VGO feed of Table 4 was compared to that of a sulfided reference sample made from an oxide (only) catalyst precursor of approximate stoichiometry $NiMo_{0.5}W_{0.5}O_4$ (catalyst B). Catalyst A was found to have an RWA of 1.02, indicating it to have practically the same HDN activity as the catalyst B.

Example 8

Testing of Catalysts of Example 1

The HDN activity of sulfided samples of catalysts 1a, 1a//$N_2$, 1b, and 1b//$N_2$, all of which were described in Example 1, were compared against the HDN activity of a sulfided reference sample made from catalyst B. The activities were normalized on a weight basis, relative to the reference, and are shown in Table 5. Because of the relatively low density of these bimetallic oxide-amine hybrid phases, the activities on a relative volume basis were less than that of the reference catalyst.

TABLE 5

| Sample | Composition | RWA |
|---|---|---|
| 1a | $NiWO_4(1,2DACH)_2$ | ~1.07 |
| 1a//$N_2$ | $NiWO_4(1,2DACH)_2$//$N_2$ | ~1.28 |
| 1b | $NiWO_4(1,2DACH)_2$//$citric_{0.33}$ | ~0.60 |
| 1b//$N_2$ | $NiWO_4(1,2DACH)_2$//$citric_{0.33}$//$N_2$ | ~1.18 |

Table 5 shows that the high temperature inert treatment of the bimetallic oxide-amine precursors, whether citric acid was impregnated or not, improved their activity. The low density, and consequent lower volumetric activity, of these Example 1 precursors tends to make them less preferred than the catalysts of Examples 2-7.

Example 9

Testing of Catalysts of Example 3

The HDN activity of sulfided samples of catalysts 3a, 3b, and 3b//$N_2$, all of which were described in Example 3, were compared against the HDN activity of a sulfided reference sample made from catalyst B. The activities were normalized on a weight basis relative to the reference and are shown in Table 6.

TABLE 6

| Sample | Composition | RWA |
|---|---|---|
| 3a | Ni—W//$en_1$ (no citric) | ~0.56 |
| 3b | Ni—W//$en_1$//$citric_{0.33}$ | ~0.74 |
| 3b//$N_2$ | Ni—W//$en_1$//$citric_{0.33}$//$N_2$ treat | ~1.16 |

Table 6 shows that HDN activities higher than that of the reference catalyst can be reached by having both the diamine and the organic acid present simultaneously, especially with the sample being treated in an inert stream at elevated temperature before sulfiding. Since the catalyst with both the amine and citric acid treatment exhibited a crystal structure (see FIG. 4) of the mixed oxide ($NiWO_4$) with the organic acid-salt coating its surface, the relatively high density of the oxide phase was maintained, and the relative volume activity was also higher than the reference.

Example 10

Testing of Nitrogen-Treated Catalysts of Examples 3 and 4

A sulfided sample of catalyst 3b//$N_2$ was selected together with a repeat sample preparation of same catalyst (catalyst 3b//$N_2$ repeat) and with a sulfide sample of catalyst precursor 4a//$N_2$ (having the same composition but with the reverse sequence of addition, i.e., with citric acid added first and then followed by ethylene diamine and subjected to the high temperature nitrogen treatment). These three samples, along with a sulfided reference sample made from catalyst B, were compared in a HDN activity test using the vacuum gas oil described in Table 4. The results are shown in Table 7.

TABLE 7

| Sample | Composition | RWA |
|---|---|---|
| 3b//$N_2$ | Ni—W//$en_1$//$citric_{0.33}$//$N_2$ treat | ~1.39 |
| 3b//$N_2$ repeat | Ni—W//$en_1$//$citric_{0.33}$//$N_2$ treat | ~1.29 |
| 4a//$N_2$ | Ni—W//$citric_{0.33}$//$en_1$//$N_2$ treat | ~1.36 |

The data in Table 7 indicates that the sequence of addition of the ethylene diamine and citric acid is not critical.

Example 11

Testing of Nitrogen-Treated Catalysts of Example 5

Sulfided samples of the catalyst precursors with different organic bases were selected from preparations of Example 5 and were tested in an HDN test using the vacuum gas oil of Table 4, together with a sulfided reference sample made from catalyst B. The results are shown in Table 8.

TABLE 8

| Sample | Composition | RWA |
|---|---|---|
| 5a//$N_2$ | Ni—W//$ethanolamine_1$//$citric_{0.33}$//$N_2$ | ~1.31 |
| 5b//$N_2$ | Ni—W//$o$-$phenylendiamine_1$//$citric_{0.33}$//$N_2$ | ~1.38 |
| 5c//$N_2$ | Ni—W//$1,4\ diaminocyclohexane_1$//$citric_{0.33}$//$N_2$ | ~1.47 |
| 5d//$N_2$ | Ni—W//$1,2\ propylenediamine_1$//$citric_{0.33}$//$N_2$ | ~1.23 |
| 5e//$N_2$ | Ni—W//$1,2\ diaminocyclohexane_1$//$citric_{0.33}$//$N_2$ | ~1.33 |
| 5f//$N_2$ | Ni—W//$n$-$propylamine_1$//$citric_{0.33}$//$N_2$ | ~1.21 |
| 5h//$N_2$ | Ni—W//$1,3\ propylenediamine_1$//$citric_{0.33}$//$N_2$ | ~1.41 |

The data in Table 8 shows that the promotion effect observed with the dual organics occurred with other diamines and also with an aminoalcohol. In addition, sample 5f//$N_2$, which contains propylamine, although it showed a higher number of stacks than the diamines as seen in FIG. 7, has only a marginally lower activity, indicating that either monoamines or diamines can be used as long as there was also a treatment with an organic acid and a subsequent inert treatment.

Example 12

Testing of Further Nitrogen-Treated Catalysts of Example 5

Sulfided samples of the catalyst precursors impregnated with maleic acid were selected from preparations of Example 5 and were tested in an HDN test using the vacuum gas oil of Table 4, together with a sulfided reference sample made from catalyst B. The results are shown in Table 9.

TABLE 9

| Sample | Composition | RWA |
|---|---|---|
| 5k//N$_2$ | Ni—W//ethylenediamine$_1$//maleic$_{0.50}$//N$_2$ | ~1.38 |
| 5l//N$_2$ | Ni—W//ethylenediamine$_{1.5}$//maleic$_{0.75}$//N$_2$ | ~1.27 |
| 5m//N$_2$ | Ni—W//1,2 propylenediamine$_{1.5}$//maleic$_{0.75}$//N$_2$ | ~1.33 |

The data in Table 9 shows that organic acids other than citric acid can also be used to prepare active catalysts.

Example 13

Testing of Nitrogen-Treated Catalyst of Example 6

A sulfided sample of the niobium-containing precursor catalyst 6b//N$_2$ was compared with a sulfided reference sample made from catalyst B in an HDN test using the vacuum gas oil of Table 4 and was found to have an RWA of about 1.53. This result shows that the addition of Nb to the precursor Ni—W oxide can impart significant additional activity to the Ni—W precursors prepared with the dual organic promotion.

Example 14

Testing of Catalysts of Example 7

Sulfided samples of catalyst 7 (approximate stoichiometry Co$_1$W$_{0.5}$V$_{0.5}$ oxide only) and catalyst 7a//N$_2$ (approximate stoichiometry Co$_1$W$_{0.5}$V$_{0.5}$ oxide impregnated with ethylenediamine and citric acid and heated in nitrogen) were compared with a sulfided reference sample made from catalyst B in an HDN test using the vacuum gas oil of Table 4. The results are shown in Table 10.

TABLE 10

| Sample | Composition | RWA |
|---|---|---|
| 7 | Co$_1$V$_{.5}$W$_{.5}$ | ~0.72 |
| 7a//N$_2$ | Co$_1$V$_{.5}$W$_{.5}$//ethylenediamine$_1$//citric$_{.33}$//N$_2$ | ~1.65 |

Table 10 shows that this composition containing cobalt, vanadium, and tungsten with the dual organic promoters and high temperature inert treatment was more active than the host oxide catalyst and exceeded the activity of the reference material.

Example 15

Flow Reactor Testing of Catalysts of Example 5

In this Example, catalyst activity results were obtained using a three phase flow reactor test. Each of the three reactors used in the test was a stainless steel U-shaped vessel having a ~0.28 inch (~0.7 cm) internal diameter, with quartz wool at the inlet and quartz wool and a glass fitted gasket at the exit. Each of the three reactors was loaded with a different catalyst precursor to be tested and was placed in a common sand bath and run in an up-flow mode. The catalyst precursors employed in the tests were: (a) sample 5b//N$_2$ (NiWO$_4$//o-phenylendiamine$_1$//citric$_{0.33}$//N$_2$ treated at about 320° C.), (b) sample 5g//N$_2$ (NiWO$_4$//cyclohexylamine$_1$//citric acid$_{0.33}$//N$_2$ treated at about 320° C.), and (c) the reference catalyst, catalyst B, (approximate stoichiometry Ni$_1$Mo$_{0.5}$W$_{0.5}$O$_4$). Each of the samples was pilled, crushed, and sieved to ~35/60 mesh (~250-500 μm), and then mixed with ~40-60 mesh quartz powder, to give a total volume of about 6 cc, with half the volume comprising the catalyst precursor and half the quartz diluent.

After the charged reactors were pressure-tested for about 4 hours with N$_2$ at about 400 psig (about 2.9 MPag) outside the sand bath and with H$_2$ at about 1250 psig (about 8.72 MPag) inside the sand bath, the pressure was lowered to around atmospheric pressure, and, with the H$_2$ flowing at about 48 sccm, the temperature was raised to about 100° C. At about 100° C., the pressure was set to about 100 psig (about 790 kPa), H$_2$ flow was stopped, and the sulfiding feed (about 7.5 wt % dimethyl disulfide, dissolved in a diesel boiling range stream) was flowed at about 8 ml/hr over each catalyst for about 4 hours. Then, with the sulfiding feed continuing, H$_2$ was added to each reactor at a flow rate of about 48 sccm, the pressure was raised to about 650 psig (about 4.6 MPag), and then the temperature was increased to about 235° C. over about 4 hours. The system was then kept isothermal at about 235° C. for about another 12 hours. Following that isothermal treatment, the temperature was raised to about 345° C. over a period of about 4.5 hours and was isothermally held for about another 16 hours. This completed the sulfiding of the catalyst.

The temperature was then cooled to about 230° C. over an ~8 hour period, and the sulfiding feed was then replaced by the vacuum gas oil (VGO) specified below in Table 11. The feed vessels, ISCO pumps, reservoirs, and all the unit lines were heated to ~80-120° C. to keep the VGO feed flowing. The pressure was raised to about 1200 psig (about 8.4 MPag) and the temperature increased from about 230° C. to about 365° C. over a period of about 4 hours. The VGO flow was set at about 3.3 ml/hr, and the H$_2$ flow rate was set to about 49.5 sccm. This was roughly equivalent to an LHSV of about 1 hr$^{-1}$ and a hydrogen flow of about 5000 scf/bbl. After about 18-24 hours, the first liquid samples were obtained, and sampling was continued once a day for the remainder of the run. A calibrated ANTEK™ 9000 series analyzer was used to measure the sulfur and nitrogen content of the diluted product.

TABLE 11

| Gravity, API | ~21.6 |
|---|---|
| Sulfur, wt % | ~1.464 |
| Nitrogen, wppm | ~1614 |
| Specific Gravity, g/cm$^3$ | ~0.924 |
| GC Distillation (wt %), ° F. | |
| IBP | ~496 |
| 10 | ~663 |
| 30 | ~768 |
| 50 | ~839 |
| 70 | ~913 |
| 90 | ~1007 |
| 95 | ~1048 |
| Saturates, wt % | ~43.3 |
| 1-Ring Aromatics, wt % | ~18.6 |
| 2-Ring Aromatics, wt % | ~15.4 |
| 3-Ring Aromatics, wt % | ~10.7 |
| Total Aromatics, wt % | ~44.7 |

Figure 10:
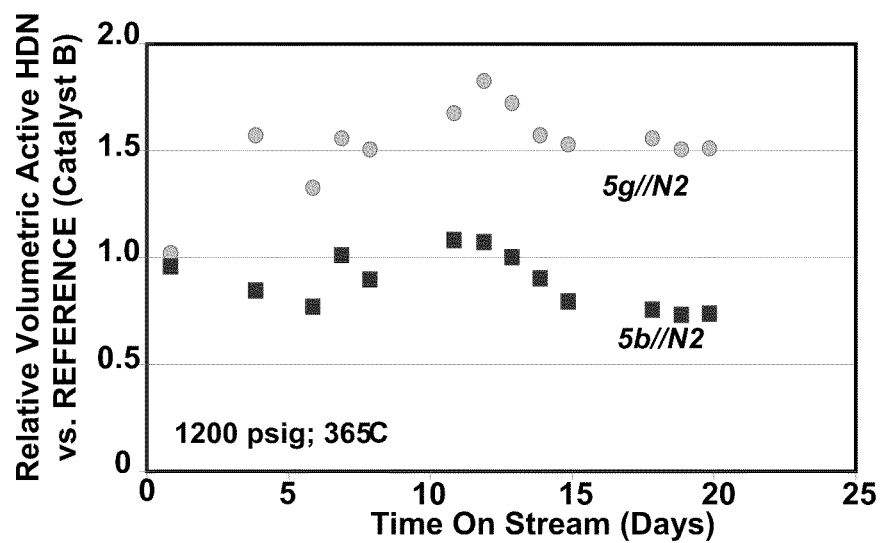
FIG. 10 represents a graph of relative hydrodenitrogenation activity against time on stream for certain Example 5 catalysts, compared to the activity of a reference catalyst.

The results for the relative volumetric activities (RVAs) of the catalysts for hydrodenitrogenation of the VGO feed are shown in FIG. 10, assuming ~1.25 order in nitrogen.

Example 16

Preparation of NiWO$_4$//(Oleylamine)$_{0.23}$(air 250° C.)/Citric Acid$_{0.19}$(Air 230° C.)//N$_2$ 320° C.

The NiWO$_4$ from Example 1 was impregnated with oleylamine (70% technical grade, commercially available from Aldrich of Milwaukee, Wis.), such that the mole ratio of $NiWO_4$ to oleylamine was about 1:0.23. The sample was first dried at about 100° C. overnight in a drying oven and was then placed in a box furnace, which was programmed at a ramp rate of about 2° C./min up to about 250° C. The sample was held at that temperature for about 4 hours in stagnant air. This sample was then impregnated with an aqueous citric acid solution, such that the $NiWO_4$ to citric acid mole ratio was about 1:0.19. This sample was again dried at about 100° C. overnight in a drying oven and was then placed in a box furnace in air, which was programmed at a ramp rate of about 2° C./min up to about 230° C. The sample was held at that temperature for about 4 hours and was then placed in a quartz line tube furnace and heated in a flowing nitrogen stream (about 300 cm³/min) with a heating rate of about 2° C./min to a final temperature of about 320° C. The sample was held at that temperature for about 90 minutes and was then cooled to ambient/room temperature and removed from the furnace. It was labeled as catalyst C.

Example 18

Preparation of $NiWO_4$//Aniline$_1$//Citric Acid$_{0.33}$//N$_2$ 320° C.

The $NiWO_4$ from Example 1 was impregnated with aniline (ACS reagent, 99.5%, commercially available from Aldrich of Milwaukee, Wis.), such that the mole ratio of $NiWO_4$ to aniline was about 1:1. The sample was placed into a drying oven and maintained at about 100° C. overnight. The sample was then impregnated with an aqueous citric acid solution, such that the $NiWO_4$ to citric acid mole ratio was about 1:0.33. This sample was again dried at about 100° C. overnight in a drying oven and was then heated in a flowing nitrogen stream (about 300 cm³/min) in a quartz line tube furnace with a heating rate of about 2° C./min to a final temperature of about 320° C. The sample was held at that temperature for about 90 minutes and was then cooled to ambient/room temperature and removed from the furnace. It was labeled as catalyst D.

Example 19

Preparation of $NiWO_4$//(Oleylamine)$_{0.13}$/(Citric Acid)$_{0.15}$//Air 230° C.

The $NiWO_4$ from Example 1 was impregnated with oleylamine (70% technical grade, commercially available from Aldrich of Milwaukee, Wis.), such that the mole ratio of $NiWO_4$ to oleylamine was about 1:0.13. The sample was placed into a drying oven and maintained at about 100° C. overnight. The sample was then impregnated with an aqueous citric acid solution, such that the $NiWO_4$ to citric acid mole ratio was about 1:0.15. This sample was again dried at about 100° C. overnight in a drying furnace and was then placed in a box furnace in air and heated at a rate of about 0.5° C./min to a final temperature of about 230° C. The sample was held at that temperature for about 4 hours and was then cooled to ambient/room temperature and removed from the furnace. It was labeled as catalyst E.

Example 20

Preparation $NiWO_4$//(Oleylamine)$_{0.13}$/(Citric Acid)$_{0.15}$//N$_2$ 320° C.

The $NiWO_4$ from Example 1 was impregnated with oleylamine (70% technical grade, commercially available from Aldrich of Milwaukee, Wis.), such that the mole ratio of $NiWO_4$ to oleylamine was about 1:0.13. The sample was placed into a drying oven and maintained at about 100° C. overnight. The sample was then impregnated with an aqueous citric acid solution, such that the $NiWO_4$ to citric acid mole ratio was about 1:0.15. This sample was again dried at about 100° C. overnight in a drying furnace and was then placed in a box furnace and heated in a flowing nitrogen stream (about 400 cm³/min) in a quartz line tube furnace with a heating rate of about 2° C./min to a final temperature of about 320° C. The sample was held at that temperature for about 90 minutes and was then cooled to ambient/room temperature and removed from the furnace. It was labeled as catalyst F.

The organic contents of the different samples, obtained by thermogravimetric measurements, are listed below in Table 12.

TABLE 12

| Catalyst Precursor | Approximate organic content after impregnation and indicated thermal treatment of precursor (%) |
|---|---|
| A | 0 |
| C | 15.8 |
| D | 12.7 |
| E | 15.8 |
| F | 11.8 |

Figure 11:
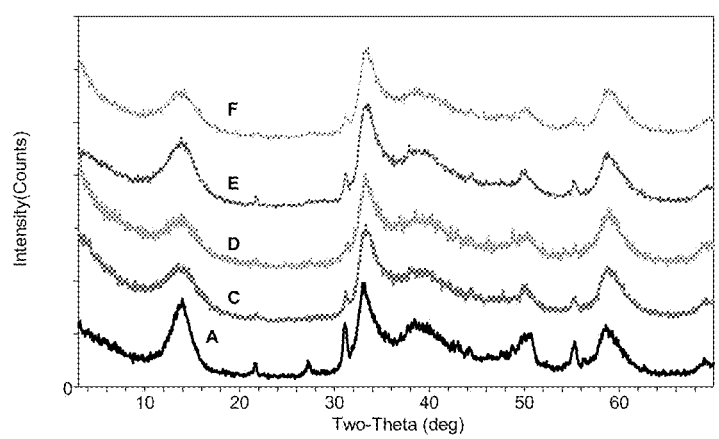
FIG. 11 represents x-ray diffraction spectra of Catalysts A and C—F following sulfidation in H$_2$S/H$_2$.

The catalyst precursors compositions were sulfided, as described above, and their sulfided XRD spectra are shown in FIG. 11 (the spectrum for Catalyst A is shown in FIG. 1, and its synthesis was described in Comparative Example 1 herein). The sulfided sample prepared using aniline as the first organic compound exhibited only a slighter broader (002) peak than the samples obtained using propylamine and cyclohexylamine as the first organic compound (Samples 5f and 5g, respectively). The samples prepared using oleylamine as the first organic (Catalysts C, E, and F) compound show measurably broader (002) peaks, indicating notably smaller numbers of stacks and thus notably smaller crystallites.

Catalysts A and C—F were compared in two different three phase flow reactor tests using a VGO feed. The VGO used in test had the properties shown below in Table 11 hereinabove.

Each of the powdered catalyst samples were pilled, crushed, and sieved to approximately 35/60 mesh (about 250-500 μm diameter), and then mixed with ~40-60 mesh quartz powder to give a total volume of about 6 cm³, with roughly half of the volume comprising the catalyst sample and roughly half the quartz diluent. Each sample was loaded into a stainless steel U-shaped reactor (~0.71 cm diameter) with quartz wool at the inlet and quartz wool and a glass fritted gasket at the exit. Each of three reactors was placed in a common sand bath and run in an up-flow mode. After the charged reactors were pressure-tested for about 4 hours with nitrogen at about 400 psig (about 2.8 MPag) outside the sand bath and with hydrogen at about 1250 psig (about 8.62 MPag) inside the sand bath, the pressure was lowered to approximately atmospheric pressure. Then, with the hydrogen flowing at about 48 Scm³/min (sccm), the temperature was raised to about 100° C. At about 100° C., the pressure was increased to about 100 psig (about 690 kPag), hydrogen flow was stopped, and the sulfiding feed (about 7.5 wt % dimethyl disulfide, or DMDS, dissolved in a diesel boiling range feed) flowing at a rate of about 8 mL/hr was passed over each sample for about 4 hours. Then, with the sulfiding feed continuing, hydrogen was added to each reactor with a flow rate of about 48 sccm, at which point the pressure was raised to about 650 psig (about 4.5 MPag) and then the temperature was increased to about 235° C. over about the next 4 hours. The system was then held at approximately isothermal conditions at about 235° C. for about another 12 hours. Following that isothermal treatment, the temperature was raised again to about 345° C. over a period of about 4.5 hours and held at approximately isothermal conditions for about another 16 hours, at which point catalyst sulfidation was considered complete.

The temperature was then cooled to about 230° C. over about an 8 hour period, and the sulfiding feed was replaced by the vacuum gas oil (VGO). The feed vessels, ISCO pumps reservoirs, and all the unit lines were heated to about 80-120° C. to facilitate flow of the VGO (e.g., to put the VGO in a liquid state). The pressure was then raised to about 1200 psig (about 8.3 MPag) and the temperature increased from about 230° C. to about 365° C. over a period of about 4 hours. VGO flow was set at about 3.3 mL/hr, and the hydrogen flow rate was set to about 49.5 sccm, which was equivalent to an LHSV of about 1.1 hr$^{-1}$ and a hydrogen flow of about 5000 scf/bbl (about 845 Sm$^3$/m$^3$). After about 18-24 hours, the first liquid samples were obtained, and sampling was continued once a day for the remainder of the run. A calibrated ANTEK 9000 series instrument was used to measure the sulfur and nitrogen content of the diluted product. Catalysts A, C, and D were compared after about 20 days on stream. The nitrogen and sulfur contents are shown in Table 13.

TABLE 13

| Catalyst | Days on stream | N ppm | S ppm |
|---|---|---|---|
| A | 20 | 209 | 250 |
| C | 20 | 76 | 86 |
| D | 20 | 86 | 90 |

Catalysts A, E, and F were compared in a similar feed under similar conditions. After about 29 days on stream, the nitrogen and sulfur contents in the product, as well as the RVAs and RMAs based on HDN activity, were obtained and are shown in Table 14.

TABLE 14

| Catalyst | Days on stream | N ppm | S ppm | RVA | RMA |
|---|---|---|---|---|---|
| A | 29 | 321 | 356 | 1.00 | 1.00 |
| E | 29 | 69 | 64 | 1.75 | 1.59 |
| F | 29 | 304 | 337 | 1.09 | 0.90 |

Figure 12:
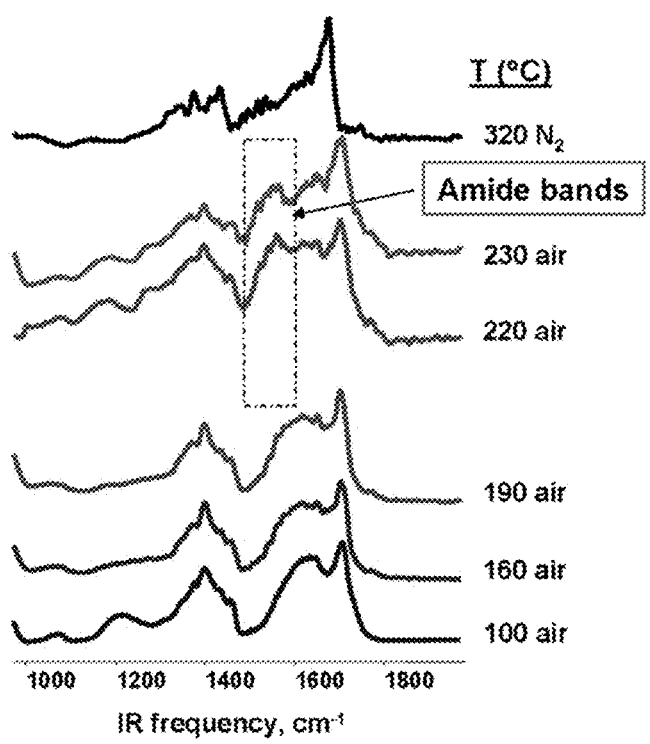
FIG. 12 shows amide formation and decomposition in air and nitrogen for catalyst precursors treated in a similar manner to Catalysts E and F.

Infrared spectra were obtained for a series of catalyst precursors including Catalyst Precursors E and F (NiWO$_4$//(oleylamine)$_{0.13}$/citric acid$_{0.15}$/air 230° C. and NiWO$_4$//(oleylamine)$_{0.13}$/citric acid$_{0.15}$/N$_2$ 320° C., respectively), where the treatment temperature was varied from about 100° C. to about 230° C. in air and to about 320° C. in nitrogen (pre-sulfidation). The results are shown in FIG. 12.

Example 21

Preparation of NiWO$_4$//(Oleylamine)$_{0.1}$/(Oleic Acid)$_{0.06}$//Air 220° C.

The NiWO$_4$ from Example 1 was impregnated with oleylamine (70% technical grade, commercially available from Aldrich of Milwaukee, Wis.), such that the mole ratio of NiWO$_4$ to oleylamine was about 1:0.10. The sample was placed into a drying oven and maintained at about 100° C. overnight. The sample was then impregnated with oleic acid (90% technical grade, commercially available from Aldrich of Milwaukee, Wis.), such that the NiWO$_4$ to oleic acid mole ratio was about 1:0.06. This sample was again dried at about 100° C. overnight in a drying furnace and was then placed in a box furnace in air and heated at a rate of about 0.5° C./min to a final temperature of about 220° C. The sample was held at that temperature for about 4 hours and was then cooled to ambient/room temperature and removed from the furnace. It was labeled as catalyst G. The approximate organic content of Catalyst G (before sulfidation) was found to be about 17.4%.

Another run was performed with the same VGO feed from Table 11 herein in the same manner as in Example 20 at the following conditions: a temperature of about 365° C., a total pressure of about 1200 psig (about 8.3 MPag), a hydrogen treat gas rate of about 5000 scf/bbl (about 845 Sm$^3$/m$^3$), and a weight hourly space velocity (WHSV) of about 1.1 hr$^{-1}$. The HDN and HDS capability of Catalysts A, E, and G were compared after about 23 days on stream. The nitrogen and sulfur contents were obtained and are shown in Table 15 below. Following a change in conditions to decrease the pressure (to about 800 psig, or about 5.5 MPag) and space velocity (down to about 0.73 hr$^{-1}$), the sulfur and nitrogen contents after about 34 days on stream were obtained and are shown in Table 16 below.

TABLE 15

| Catalyst Precursor | Days on stream | N ppm | S ppm |
|---|---|---|---|
| A | 23 | 330 | 329 |
| E | 23 | 57 | 49 |
| G | 23 | 57 | 46 |

TABLE 16

| Catalyst Precursor | Days on stream | N ppm | S ppm |
|---|---|---|---|
| A | 34 | 271 | 146 |
| E | 34 | 75 | 30 |
| G | 34 | 84 | 27 |

Example 22

Preparation of NiWO$_4$//(Oleylamine)$_{0.13}$//Air 230° C.

The NiWO$_4$ from Example 1 was impregnated with oleylamine (70% technical grade, commercially available from Aldrich of Milwaukee, Wis.), such that the mole ratio of NiWO$_4$ to oleylamine was about 1:0.13. The sample was placed into a drying furnace and maintained at about 100° C. overnight. This sample was then heated in air at a rate of about 0.5° C./min to a final temperature of about 230° C. The sample was held at that temperature for about 4 hours and was then cooled to ambient/room temperature and removed from the furnace. It was labeled as catalyst H. The approximate organic content of Catalyst H (before sulfidation) was found to be about 12.2%.

Example 23

Preparation of NiWO$_4$//(Oleic Acid)$_{0.13}$//Air 220° C.

The NiWO$_4$ from Example 1 was impregnated with oleic acid (90% technical grade, commercially available from Aldrich of Milwaukee, Wis.), such that the mole ratio of NiWO$_4$ to oleic acid was about 1:0.13. The sample was placed into a drying furnace and maintained at about 100° C. overnight. This sample was then heated in air at a rate of about 0.5° C./min to a final temperature of about 220° C. The sample was held at that temperature for about 4 hours and was then cooled to ambient/room temperature and removed from the furnace. It was labeled as catalyst J. The approximate organic content of Catalyst J (before sulfidation) was found to be about 14.7%.

Another run was performed with the same VGO feed from Table 11 herein in the same manner as in Example 20 at the following conditions: a temperature of about 365° C., a total pressure of about 1200 psig (about 8.3 MPag), a hydrogen treat gas rate of about 5000 scf/bbl (about 845 Sm$^3$/m$^3$), and a weight hourly space velocity (WHSV) of about 1.1 hr$^{-1}$. The HDN and HDS capability of Catalysts A, H, and J were compared after about 19 days on stream. The nitrogen and sulfur contents, as well as the relative volume and molar HDN activities, were obtained and are shown in Table 17 below.

TABLE 17

| Catalyst Precursor | Days on stream | N ppm | S ppm | RVA | RMA |
|---|---|---|---|---|---|
| A | 19 | 315 | 339 | 1.00 | 1.00 |
| H | 19 | 114 | 80 | 1.62 | 1.55 |
| J | 19 | 110 | 92 | 1.63 | 1.43 |

These results show that the catalysts treated with both the first and second organic compounds, namely the combination of oleylamine and oleic acid (e.g., Catalysts E and G, as shown in Table 15) are more active than the catalysts treated with either the first or second organic compound, namely oleylamine alone or oleic acid alone (e.g., Catalysts H and J, as shown in Table 17), when treated under similar conditions and subject to a hydrocarbon (in these cases, VGO) feed.

Example 24

Preparation of Oxide Precursors CoWO$_4$, CoMoO$_4$, Co$_{1.5}$MoO$_{4.5}$, and Co$_{2.5}$MoO$_{5.5}$ (No Organics)

Figure 13:
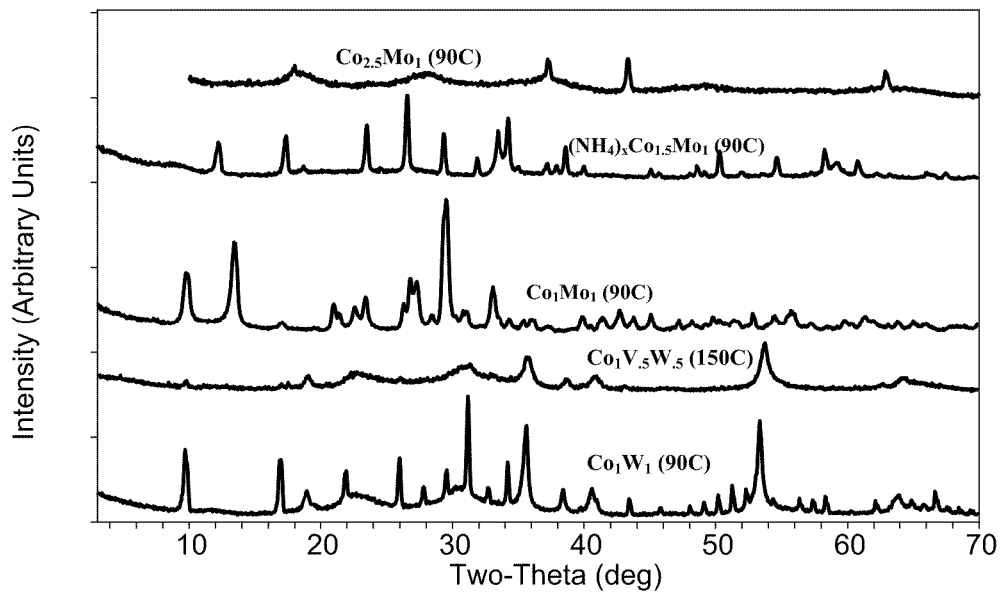
FIG. 13 shows x-ray diffraction spectra for a variety of cobalt-containing catalyst precursor oxides.

The CoWO$_4$ precursor sample was formed by a solid-slurry reaction between cobalt carbonate and tungstic acid. About 23.79 grams of cobalt carbonate and about 49.97 grams of tungstic acid were added to about 800 mL of water to form a suspension (pH≈6.4) that was placed into a ~1 L round bottom flask equipped with a condenser, which was then heated to about 90° C. for about 16 hours. After cooling to ambient/room temperature, the solid was filtered and dried overnight at about 100° C. in a drying oven. FIG. 13 shows the XRD spectrum of this sample.

The Co$_1$Mo$_1$O$_4$ precursor sample was prepared by reacting about 23.78 grams of cobalt carbonate with about 28.8 grams of MoO$_3$ slurried in ~800 mL of water. This mixture was placed into a ~1 L round bottom flask equipped with a condenser, which was then heated to about 90° C. for about 16 hours. After cooling to ambient/room temperature, the solid was filtered and dried overnight at about 100° C. in a drying oven. FIG. 13 shows the XRD spectrum of this sample.

The Co$_{2.5}$Mo$_1$O$_{5.5}$ precursor sample was prepared by reacting about 59.5 grams of cobalt carbonate with about 28.8 grams of MoO$_3$ slurried in ~800 mL of water. This mixture was placed into a ~1 L round bottom flask equipped with a condenser, which was then heated to about 90° C. for about 16 hours. After cooling to ambient/room temperature, the solid was filtered and dried overnight at about 100° C. in a drying oven. FIG. 13 shows the XRD spectrum of this sample.

The Co$_{1.5}$Mo$_1$O$_{4.5}$ precursor sample (containing ammonium ions) was prepared by first dissolving about 17.65 grams of ammonium heptamolybdate tetrahydrate (about 0.1 mole Mo) in ~800 mL of water and placing this into a ~1 L round bottom flask equipped with a condenser. To this solution, about 22.5 mL of concentrated NH$_4$OH (~3:1 mole ratio of NH$_4$OH/Co) was added, thus raising the pH to ~9.4 (solution A). This solution was then warmed to about 90° C. A second solution was prepared by dissolving about 43.64 grams of cobalt nitrate hexahydrate, (about 0.15 moles Co) in about 50 mL of water (solution B) and maintaining this solution at a temperature of about 90° C. The cobalt solution (solution B) was added dropwise at a rate of about 7 cm$^3$/min into the molybdenum solution (solution A). A precipitate began to form after about ¼ of the solution was added. The final pH after solutions A and B were mixed together was ~6.5. This suspension/slurry was stirred for an additional 30 minutes while the temperature was maintained at 90° C., after which it was cooled to ambient/room temperature, filtered, and dried at about 120° C. The total weight after drying was about 30.2 grams. The XRD spectrum of the dried sample is shown in FIG. 13.

Example 25

Preparation of CoV$_{0.5}$W$_{0.5}$O$_4$/(Oleylamine)$_{0.67}$/ (Oleic Acid)$_{0.094}$//Air 170° C.

The CoV$_{0.5}$W$_{0.5}$O$_4$ precursor sample from Example 7 was impregnated with oleylamine (70% technical grade, commercially available from Aldrich of Milwaukee, Wis.), such that the mole ratio of CoV$_{0.5}$W$_{0.5}$O$_4$ to oleylamine was about 1:0.067. The sample was placed into a drying furnace and maintained at about 100° C. overnight. This sample was then impregnated with oleic acid (90% technical grade, commercially available from Aldrich of Milwaukee, Wis.), such that the CoV$_{0.5}$W$_{0.5}$O$_4$ to oleic acid mole ratio was about 1:0.094. This sample was then dried at about 100° C. overnight, followed by heating in a box furnace in air at a rate of about 0.5° C./min to a final temperature of about 170° C. The sample was held at that temperature for about 2 hours and was then cooled to ambient/room temperature before being removed from the furnace.

Example 26

Preparation of CoWO$_4$/(Oleylamine)$_{0.13}$/(Citric Acid)$_{0.15}$//Air 10° C.

The CoWO$_4$ precursor sample from Example 24 was impregnated with oleylamine (70% technical grade, commercially available from Aldrich of Milwaukee, Wis.), such that the mole ratio of CoWO$_4$ to oleylamine was about 1:0.13. The sample was placed into a drying furnace and maintained at about 100° C. overnight. This sample was then impregnated with an aqueous citric acid solution, such that the CoWO$_4$ to citric acid mole ratio was about 1:0.15. This sample was then dried at about 100° C. overnight, followed by heating in a box furnace in air at a rate of about 0.5° C./min to a final temperature of about 210° C. The sample was held at that temperature for about 2 hours and was then cooled to ambient/room temperature before being removed from the furnace.

Example 27

Preparation of $CoMoO_4/(Oleylamine)_{0.059}/(Oleic Acid)_{0.075}//Air\ 200°\ C.$ The $CoMoO_4$ precursor sample from Example 24 was impregnated with oleylamine (70% technical grade, commercially available from Aldrich of Milwaukee, Wis.), such that the mole ratio of $CoMoO_4$ to oleylamine was about 1:0.059. The sample was placed into a drying furnace and maintained at about 100° C. overnight. This sample was then impregnated with oleic acid (90% technical grade, commercially available from Aldrich of Milwaukee, Wis.), such that the $CoWO_4$ to oleic acid mole ratio was about 1:0.075. This sample was then dried at about 100° C. overnight, followed by heating in a box furnace in air at a rate of about 0.5° C./min to a final temperature of about 200° C. The sample was held at that temperature for about 2 hours and was then cooled to ambient/room temperature before being removed from the furnace.

Example 28

Preparation of $Co_{1.5}MoO_{4.5}/(Oleylamine)_{0.067}/(Oleic Acid)_{0.085}//Air\ 170°\ C.\ or\ 200°\ C.$ The $Co_{1.5}MoO_{4.5}$ precursor sample from Example 24 was impregnated with oleylamine (70% technical grade, commercially available from Aldrich of Milwaukee, Wis.), such that the mole ratio of $Co_{1.5}MoO_{4.5}$ to oleylamine was about 1:0.067. The sample was placed into a drying furnace and maintained at about 100° C. overnight. This sample was then impregnated with oleic acid (90% technical grade, commercially available from Aldrich of Milwaukee, Wis.), such that the $Co_{1.5}MoO_{4.5}$ to oleic acid mole ratio was about 1:0.085. This sample was then dried at about 100° C. overnight, followed by heating in a box furnace in air at a rate of about 0.5° C./min to a final temperature of either about 170° C. or about 200° C. For either heating temperature, the samples were held at that temperature for about 2 hours and were then cooled to ambient/room temperature before being removed from the furnace.

Example 29

Preparation of $Co_{2.5}MoO_{5.5}/(Oleylamine)_{0.074}/Oleic Acid_{0.095}//Air\ 200°\ C.$ The $Co_{2.5}MoO_{5.5}$ precursor sample from Example 24 was impregnated with oleylamine (70% technical grade, commercially available from Aldrich of Milwaukee, Wis.), such that the mole ratio of $Co_{1.5}MoO_{4.5}$ to oleylamine was about 1:0.067. The sample was placed into a drying furnace and maintained at about 100° C. overnight. This sample was then impregnated with oleic acid (90% technical grade, commercially available from Aldrich of Milwaukee, Wis.), such that the $Co_{2.5}MoO_{5.5}$ to oleic acid mole ratio was about 1:0.095. This sample was then dried at about 100° C. overnight, followed by heating in a box furnace in air at a rate of about 0.5° C./min to a final temperature of about 200° C. The sample was held at that temperature for about 2 hours and was then cooled to ambient/room temperature before being removed from the furnace.

Example 30

Hydroprocessing Testing Comparison for Catalyst Samples

The catalysts made according to Examples 25, 27, 28, and 29, as well as a reference catalyst (CoMo supported on alumina; commercially available from Albemarle of Baton Rouge, La.), were sulfided using the following procedure. After loading each catalyst sample into a reactor vessel, with ~100% pure hydrogen flowing at about 1250 scf/bbl (about 213 $Nm^3/m^3$), the temperature was raised to about 107° C. at a rate of about 14° C./hr. At about 107° C. and at a pressure of about 380 psig (about 2.6 MPag), the sulfiding feed (dimethyl disulfide, or DMDS, dissolved in a diesel boiling range feed to attain a sulfur content of about 2.6%) flowing at a rate sufficient to attain an LHSV of about 1.0 $hr^{-1}$ was passed through each sample for about 5 hours. Then, with the sulfiding and hydrogen feeds continuing to flow, the temperature was raised to about 232° C. at a rate of about 14° C./hr and held at approximately isothermal conditions for about 20 hours. Following that isothermal treatment, the temperature was raised again to about 321° C. at a rate of about 14° C./hr and held at approximately isothermal conditions for about 12 hours, followed by another temperature increase to about 343° C. at a rate of about 14° C./hr and held at approximately isothermal conditions for about 8 hours, at which point catalyst sulfidation was considered complete.

Further, in these experiments, the reaction conditions were as follows: a temperature of about 655° F. (about 346° C.) EIT, a total pressure of about 575 psig (about 3.97 MPag), an LHSV of about 0.85 $hr^{-1}$, and a hydrogen treat gas rate of about 936 scf/bbl (about 159 $Nm^3/m^3$). These sulfided catalysts were used to hydroprocess a diesel boiling range feed having the following properties: a sulfur content of about 1.37 wt %; a nitrogen content of about 134 wppm; an API gravity of about 33.1 (degrees); and a $T_{95}$ of about 709° F. (about 376° C.). The sulfur contents of the hydroprocessed diesel boiling range products after about 20 days on stream were obtained and are shown in Table 18 below.

TABLE 18

| Catalyst | Product Sulfur (ppm) |
|---|---|
| Reference catalyst | 31 |
| Example 25 | 330 |
| Example 27 | 95 |
| Example 28* | 18 |
| Example 29 | 31 |

*170° C. treatment temperature

As can be seen from the product sulfur levels in the table above, the catalyst made according to Example 28 exhibited the lowest product sulfur, which can correlate to the highest relative hydrodesulfurization (HDS) activity (since all other reaction and feed conditions were constant).

Example 31

Catalyst Performance on Mixed Biofeed

Three catalysts were compared in a three phase flow reactor test using a predominantly VGO feed, which contained about 20 wt % soybean oil. Catalyst K was a commercially available NiMo catalyst supported on alumina. Catalyst L was a commercially available bulk NiMoW catalyst. Catalyst M was a catalyst according to the invention, with similar composition to Catalysts E and/or G. The soybean oil was substantially free of sulfur, nitrogen, and metal heteroatoms and comprised predominantly triglycerides with varying alkyl chain lengths, but mostly $C_{18}$. The VGO base used in this Example exhibited the properties delineated in Table 19 below.

TABLE 19

| | |
|---|---|
| Feed Sulfur, wt % | ~2.60 |
| Feed Nitrogen, wppm | ~828 |
| Feed Density @~70° C., g/mL | ~0.885 |
| Distillation, ° C. | |
| IBP | ~299 |
| 10 wt % | ~368 |
| 30 wt % | ~408 |
| 50 wt % | ~436 |
| 70 wt % | ~463 |
| 90 wt % | ~497 |
| 95 wt % | ~510 |
| Saturates, wt % | ~43 |
| Aromatics, wt % | ~50 |
| 1-ring aromatics, wt % | ~14 |
| 2-ring aromatics, wt % | ~16 |
| 3-ring aromatics, wt % | ~13 |
| 4-ring aromatics, wt % | ~7 |

The Catalysts were sulfided using a procedure similar to that described in Example 20 herein. Further, in these experiments, the reaction conditions were as follows: a temperature of about 680° F. (about 360° C.) EIT, a total pressure of about 1287 psig (about 8.87 MPag), and a hydrogen treat gas rate of about 5950 scf/bbl (about 1010 $Nm^3/m^3$). Catalyst K was run at an LHSV of about 0.77 $hr^{-1}$, while Catalysts L and M were each run at LHSV values of about 1.08 $hr^{-1}$. The nitrogen and sulfur contents after about 78 days on stream were obtained and are shown in Table 20 below.

TABLE 20

| Catalyst | Days on stream | N ppm | S ppm |
|---|---|---|---|
| K | 78 | 51 | 446 |
| L | 78 | 27 | 163 |
| M | 78 | 15 | 62 |

The liquid product obtained was substantially oxygen free, with greater than 99% removal of oxygen. The oxygen was removed in various forms, e.g., as water, CO, and/or $CO_2$. Table 21 shows the $H_2S$-free concentrations of these side-products in the reactor gas effluent stream.

TABLE 21

| Catalyst | Days on stream | CO wt % | $CO_2$ wt % |
|---|---|---|---|
| K | 78 | 3.2 | 3.4 |
| L | 78 | 4.5 | 5.9 |
| M | 78 | 2.2 | 6.6 |

Example 32

Catalyst Performance on Mixed Biofeed

Catalysts K, L, and M were compared in a three phase flow reactor test using a predominantly gasoil feed, which contained about 20 wt % soybean oil. The soybean oil was the same as in Example 31, but the gasoil base used in this Example exhibited the properties delineated in Table 22 below.

TABLE 22

| | |
|---|---|
| Feed Sulfur, wt % | ~1.79 |
| Feed Nitrogen, wppm | ~383 |
| Feed API Gravity, degrees | ~31.0 |

TABLE 22-continued

| | |
|---|---|
| Distillation, ° F. | |
| IBP | ~305 |
| 10 wt % | ~542 |
| 30 wt % | ~615 |
| 50 wt % | ~647 |
| 70 wt % | ~677 |
| 90 wt % | ~715 |
| 95 wt % | ~723 |
| Saturates, wt % | ~67.3 |
| Aromatics, wt % | ~32.7 |
| 1-ring aromatics, wt % | ~20.8 |
| 2-ring aromatics, wt % | ~10.2 |
| 3-ring aromatics, wt % | ~1.8 |

The Catalysts were sulfided using a procedure similar to that described in Example 20 herein. Further, in these experiments, the reaction conditions were as follows: a temperature of about 625° F. (about 329° C.) EIT, a total pressure of about 1000 psig (about 6.9 MPag), and a treat gas rate of about 2070 scf/bbl (about 350 $Nm^3/m^3$). Catalyst K was run at an LHSV of about 0.78 $hr^{-1}$, while Catalysts L and M were each run at LHSV values of about 1.11 $hr^{-1}$. The nitrogen and sulfur contents after about 78 days on stream were obtained and are shown in Table 23 below.

TABLE 23

| Catalyst | Days on stream | N ppm | S ppm |
|---|---|---|---|
| K | 84 | 42 | 1288 |
| L | 84 | 17 | 743 |
| M | 84 | 9 | 437 |

The liquid product obtained was substantially oxygen free, with greater than 99% removal of oxygen. The oxygen was removed in various forms, e.g., as water, CO, and/or $CO_2$. Table 24 shows the $H_2S$-free concentrations of these side-products in the reactor gas effluent stream.

TABLE 24

| Catalyst | Days on stream | CO wt % | $CO_2$ wt % |
|---|---|---|---|
| K | 84 | 0.81 | 1.40 |
| L | 84 | — | — |
| M | 84 | 1.54 | 1.22 |

Example 33

Catalyst Performance in Hydrocracking Function

Catalysts K, L, and M were compared in a three phase flow reactor test using two different VGO feeds, labeled VGO1 and VGO2. The VGO feeds used in this Example exhibited the properties delineated in Table 25 below.

TABLE 25

| Property | VGO1 | VGO2 |
|---|---|---|
| Feed Sulfur, wt % | ~2.64 | ~2.96 |
| Feed Nitrogen, wppm | ~690 | ~1510 |
| Feed API Gravity, degrees | ~21.8 | ~17.8 |
| Distillation, ° F. | | |
| IBP | ~595 | ~700 |
| 10 wt % | ~706 | ~845 |
| 30 wt % | ~748 | ~926 |

TABLE 25-continued

| Property | VGO1 | VGO2 |
|---|---|---|
| 50 wt % | ~822 | ~975 |
| 70 wt % | ~845 | ~1038 |
| 90 wt % | ~923 | ~1104 |
| 95 wt % | ~946 | ~1146 |
| FBP | ~1003 | ~1164 |

The Catalysts were sulfided using a procedure similar to that described in Example 20 herein. Further, in these experiments, the reaction conditions were varied. The nitrogen and sulfur contents after about 40 days on stream were obtained for VGO1 feed at the following conditions: a temperature of about 710° F. (about 377° C.) EIT, an LHSV of about 1.4 hr$^{-1}$, and a hydrogen treat gas rate of about 4000 scf/bbl (about 680 Nm$^3$/m$^3$). Catalyst K was run at a total pressure of about 1875 psig (about 12.9 MPag), while Catalysts L and M were each run at a total pressure of about 1275 psig (about 8.8 MPag). Results are shown in Table 26 below, which indicate superior performance of the treated catalyst composition, even at relatively lower pressures.

TABLE 26

| Catalyst | Days on stream | N ppm | S ppm |
|---|---|---|---|
| K | 40 | <10 | 1959 |
| L | 40 | <10 | 501 |
| M | 40 | <10 | 163 |

Then, the nitrogen and sulfur contents after about 69 days on stream were obtained for VGO1 feed at the following conditions: a temperature of about 710° F. (about 377° C.) EIT, a total pressure of about 1875 psig (about 12.2 MPag), and a hydrogen treat gas rate of about 4000 scf/bbl (about 680 Nm$^3$/m$^3$). Catalysts L and M were each run at an LHSV of about 2.3 hr$^{-1}$, while Catalyst K was run at an LHSV of about 1 hr$^{-1}$. Results are shown in Table 27 below, which indicate superior performance of the treated catalyst composition, even at relatively higher space velocities.

TABLE 27

| Catalyst | Days on stream | N ppm | S ppm |
|---|---|---|---|
| K | 69 | <10 | 34 |
| L | 69 | <10 | 47 |
| M | 69 | <10 | 23 |

Thereafter, the nitrogen and sulfur contents after about 74 days on stream were obtained for VGO2 feed at the following conditions: a temperature of about 710° F. (about 377° C.) EIT, a total pressure of about 1875 psig (about 12.2 MPag), an LHSV of about 2 hr$^{-1}$, and a hydrogen treat gas rate of about 4000 scf/bbl (about 680 Nm$^3$/m$^3$). Results are shown in Table 28 below, which indicate superior performance of the treated catalyst composition, even for heavier/more refractory feeds.

TABLE 28

| Catalyst | Days on stream | N ppm | S ppm |
|---|---|---|---|
| K | 74 | 589 | 3225 |
| L | 74 | 226 | 1315 |
| M | 74 | 158 | 776 |

Example 34

Preparation of NiMo$_{0.5}$W$_{0.5}$O$_4$//(Oleylamine)$_{0.10}$/ (Oleic Acid)$_{0.06}$//Air 220° C.

NiMo$_{0.5}$W$_{0.5}$O$_4$ was prepared as described in Comparative Example 1. After it was dried and calcined at about 300° C., it was composited with an inert binder into bound particles, such that about 7 wt % of the weight of the bound particles was the inert binder (with the remainder being the mixed metal oxide). About 6.48 g of oleylamine (70% technical grade, commercially available from Aldrich of Milwaukee, Wis.) was mixed together with about 3.08 g of oleic acid (90% technical grade, commercially available from Aldrich of Milwaukee, Wis.) and heated to about 100° C. to form a solution. About 50 grams of the bound particles of NiMo$_{0.5}$W$_{0.5}$O$_4$ were likewise heated to about 100° C., and then the solution was used to simultaneously co-impregnate the organic components into/onto the bound particles. The resultant catalyst had an approximate composition of NiMo$_{0.5}$W$_{0.5}$O$_4$(oleylamine)$_{0.10}$(oleic acid)$_{0.06}$. This impregnated sample was dried in a drying furnace overnight at about 100° C., placed in a box furnace, heated in air at about 0.5° C./min up to about 220° C., and held for about four hours at that temperature. The heat treated sample was then cooled to ambient/room temperature and removed from the furnace (labeled as catalyst P). This sample was compared against the NiMo$_{0.5}$W$_{0.5}$O$_4$ described in Comparative Example 1, which was calcined at about 300° C. and formed into particles by compositing with an inert binder into bound particles, such that about 7 wt % of the weight of the bound particles was the inert binder (with the remainder being the mixed metal oxide), but which bound particles were not subjected to organic impregnation (labeled as catalyst N).

Both catalyst samples N and P were sulfided using a procedure similar to that described in Example 20 herein. Upon sulfiding, the catalyst samples were each contacted with the same VGO feed from Table 11 herein in the same manner as in Example 20 at the following conditions: a temperature of about 365° C., a total pressure of about 1200 psig (about 8.3 MPag), a hydrogen treat gas rate of about 5000 scf/bbl (about 845 Sm$^3$/m$^3$), and a weight hourly space velocity (WHSV) of about 1.1 hr$^{-1}$. The HDN and HDS capability of these catalyst samples were compared after about 13 days on stream. The nitrogen and sulfur contents were obtained and are shown in Table 29 below.

TABLE 29

| Catalyst | Days on stream | N content [wppm] | S content [wppm] |
|---|---|---|---|
| N | 13 | 310 | 320 |
| P | 13 | 172 | 138 |

Example 35

Preparation of NiWO$_4$//(Ethanolamine)$_1$/(Citric Acid)$_{0.33}$//Air 220° C.

NiWO$_4$ was prepared as described in Comparative Example 1 and was dried and calcined at about 300° C. About 20 grams of the calcined NiWO$_4$ powder was impregnated with about 3.98 grams of ethanolamine using an incipient wetness technique. The impregnated powder was dried about 100° C. overnight and then cooled to ambient/room temperature. Thereafter, an aqueous solution (~4 mL) containing about 4.18 grams of citric acid was impregnated into/onto the ethanolamine-impregnated powder to the incipient wetness point. This sequentially impregnated sample was dried in a drying furnace overnight at about 100° C., placed in a box furnace, heated in air at about 0.5° C./min up to about 220° C., and held for about four hours at that temperature. The heat treated sample was then cooled to ambient/room temperature and removed from the furnace (labeled as catalyst Q). This sample was compared against the $NiWO_4$ and $NiMo_{0.5}W_{0.5}O_4$ samples described in Comparative Example 1, which were calcined at about 300° C., but which were not subjected to organic impregnation (catalysts A and B, respectively).

Catalyst samples Q and B were sulfided using a procedure similar to that described in Example 20 herein. Upon sulfiding, the catalyst samples were each contacted with the same VGO feed from Table 11 herein in the same manner as in Example 20 at the following conditions: a temperature of about 365° C., a total pressure of about 1200 psig (about 8.3 MPag), a hydrogen treat gas rate of about 5000 scf/bbl (about 845 $Sm^3/m^3$), and a weight hourly space velocity (WHSV) of about 1.1 $hr^{-1}$. The HDN and HDS capability of these catalyst samples were compared after about 26 days on stream. The nitrogen and sulfur contents for catalysts Q and B were obtained and are shown in Table 30 below.

TABLE 30

| Catalyst | Days on stream | N content [wppm] | S content [wppm] |
|---|---|---|---|
| Q | 26 | 295 | 300 |
| B | 26 | 298 | 292 |

Figure 14:
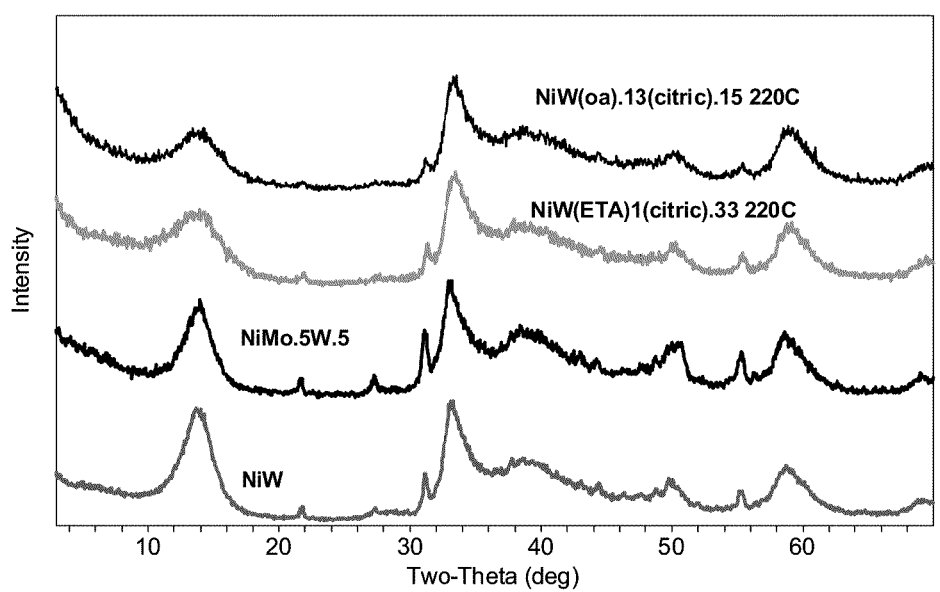
FIG. 14 shows x-ray diffraction spectra for NiW- and NiMoW-containing catalyst precursor oxides, with and without organic treatments.

Unsulfided versions of catalyst samples Q, A, B, and F ($NiMo_{0.5}W_{0.5}O_4$//(oleylamine)$_{0.13}$/(citric acid)$_{0.15}$//air 220° C.—Example 21) were analyzed using XRD techniques (FIG. 14). The XRD peak between about 8° and 18° two-theta is believed to represent the (002) crystalline reflection, which correlates to the sulfided Group 6 metal stack height in these samples. It is noteworthy that catalyst samples A and B (no organic treatment) exhibit relatively narrow and intense peaks, corresponding to stack heights of at least 4, whereas catalyst samples Q and F exhibit broader and less intense peaks, corresponding to stack heights of about 2.1 and 2.2, respectively.

Example 36

Effect of Organic Treatment Temperature on NiW Catalysts $NiWO_4$ was prepared as described in Comparative Example 1. After it was dried and calcined at about 300° C., it was composited with an inert binder into bound particles, such that about 7 wt % of the weight of the bound particles was the inert binder (with the remainder being the mixed metal oxide). Oleylamine (70% technical grade, commercially available from Aldrich of Milwaukee, Wis.) was mixed together with oleic acid (90% technical grade, commercially available from Aldrich of Milwaukee, Wis.) and heated to about 100° C. to form a solution. Three samples of the bound particles of $NiWO_4$ were likewise heated to about 100° C., and then an amount of the solution was used to simultaneously co-impregnate the organic components into/onto each of the samples of bound particles, the amount being sufficient to attain a mole ratio of $NiWO_4$ to oleylamine of about 1:0.10 and to attain a mole ratio of $NiWO_4$ to oleic acid of about 1:0.06. The resultant catalysts thus had an approximate composition of $NiWO_4$//(oleylamine)$_{0.1}$/(oleic acid)$_{0.06}$. These impregnated samples were each dried in air in a drying furnace overnight at about 100° C. One of the three samples was cooled to ambient/room temperature and stored without further treatment (labeled as catalyst R). Another of the three samples was then placed in a box furnace, heated in air at about 0.5° C./min up to about 230° C., and held for about 4 hours at that temperature. The high-temperature sample was then cooled to ambient/room temperature and removed from the furnace (labeled as catalyst S). The last of the three samples was then treated in a flowing nitrogen stream (about 200 $cm^3$/min) in a quartz line tube furnace, with a heating rate of about 2° C./min, to a final temperature of about 230° C. and held at that temperature for about 90 minutes. It was then cooled to ambient/room temperature and removed from the furnace (labeled as catalyst T).

Figure 15:
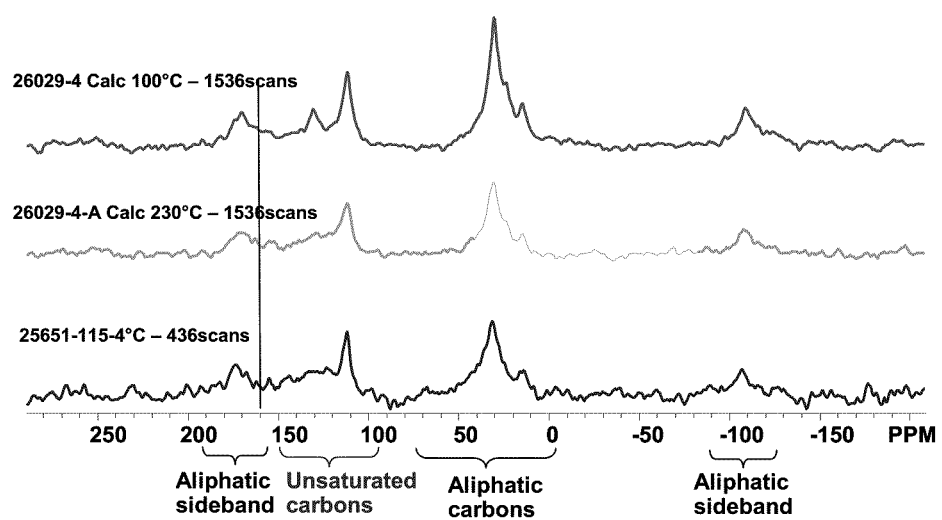
FIG. 15 shows $^{13}$C NMR spectra for bulk catalysts having undergone treatments using two organic compounds at various temperatures and under various conditions.

Catalysts R, S, and T were subsequently analyzed by solid state $^{13}C$ NMR. For these analyses, the $^{13}C$ MAS NMR spectra were recorded at ambient/room temperature (about 20-25° C.) on a ~9.4 T Varian InfinityPlus 400 spectrometer corresponding to a $^{13}C$ Larmor frequency of ~100.4 MHz using a ~4 mm (o.d.) MAS spinning probe at about 14 kHz, ~4 µsec π/2 pulses with $^1H$ decoupling during data acquisition, a pulse delay of ~60 sec, and about 436-1536 transients were collected. The $^{13}C$ NMR spectra were referenced against tetramethylsilane ($\delta_C$≈0.0 ppm), using hexamethylbenzene as a secondary external standard and setting the methyl peak at 17.36 ppm. The spectra for these three catalysts are shown in FIG. 15 (R at top, S in middle, and T at bottom). All NMR data were recorded using Varian Inc.'s Spinsight™ NMR data acquisition software and all processing was done using NutsPro™ (NMR Utility Transform Software—Professional) software package from Acorn NMR, Inc. The free induction decays (FIDs) were Fourier transformed, phased, and baseline correction done using a subroutine which fits the baseline with a 5th order polynomial. The relative amounts of the unsaturated carbon were determined by comparing the integrated area of the peaks attributed to unsaturated and aromatic carbons ($\delta_c$ extending from about 160 ppm to about 90 ppm) to the sum of the integrated areas attributed to the unsaturated and aromatic carbons plus the aliphatic/saturated carbons (sum of main aliphatic/saturated peak at $\delta_c$ extending from about 80 ppm to about 10 ppm plus the corresponding aliphatic/saturated sidebands at $\delta_c$ extending from about 200 ppm to 160 ppm and at $\delta_c$ extending from about −90 ppm to about −130 ppm). No spinning sideband intensity was detected for the unsaturated/aromatic carbons (if present, they would appear at $\delta_c$ ~250 ppm and $\delta_c$ ~−20 ppm, respectively). The results based on the NMR data is shown in Table 31 below.

TABLE 31

| Catalyst | Treatment/Temp | Unsaturated integration | Total integration | % Unsaturated Carbons |
|---|---|---|---|---|
| R | Air/100° C. | 100 | 359.7 | 27.8 |
| S | Air/230° C. | 75.3 | 221.9 | 33.9 |
| T | $N_2$/230° C. | 27.3 | 81.9 | 33.3 |

Based on this quantitative NMR data, increased unsaturation level can stem from thermal treatment of the organics at temperatures above 100° C. This NMR technique could not differentiate isolated or conjugated carbon-carbon unsaturations from aromatic unsaturations, and the percent unsaturated carbon value represents both aromatic and non-aromatic unsaturated carbons. Without being bound by theory, it is postulated that additional unsaturated carbons resulting from thermal treatment of the organics can cause an increase in observable catalytic HDN activity.

To test the idea of increased catalytic HDN activity for catalysts having additional unsaturations from organic treatment, catalysts R and S were sulfided using a procedure similar to that described in Example 20 herein. Upon sulfiding, the catalyst samples were each contacted with a VGO feed having the properties listed in Table 32 below in the same manner and under the same conditions as in Example 35.

TABLE 32

| Gravity, API | ~21.6 |
|---|---|
| Sulfur, wt % | ~1.72 |
| Nitrogen, wppm | ~1684 |
| Basic Nitrogen, wppm | ~510 |
| Hydrogen, wt % | ~12.15 |
| Nickel, wppm | ~0.5 |
| Vanadium, wppm | ~2.4 |
| GC Distillation (wt %), ° C. | |
| IBP | ~216 |
| 5 | ~311 |
| 10 | ~344 |
| 20 | ~385 |
| 30 | ~414 |
| 40 | ~435 |
| 50 | ~455 |
| 60 | ~474 |
| 70 | ~496 |
| 80 | ~519 |
| 90 | ~549 |
| 95 | ~572 |
| FBP | ~621 |
| Saturates, wt % | ~41.4 |
| 1-Ring Aromatics, wt % | ~17 |
| 2-Ring Aromatics, wt % | ~16.3 |
| 3-Ring Aromatics, wt % | ~11.5 |
| 4-Ring Aromatics, wt % | ~4.7 |
| Polars, wt % | ~1.2 |

The HDN and HDS capability of these catalyst samples were compared after about 21 days on stream. The nitrogen contents for products achieved using catalysts R and S under these conditions were obtained and are shown in Table 33 below. These results indicate the much improved HDN activity of catalyst organically treated above 100° C.

TABLE 33

| Catalyst | Days on stream | N content [wppm] | RVA | RMA |
|---|---|---|---|---|
| R | 21 | 472 | 0.98 | 1.02 |
| S | 21 | 216 | 1.61 | 1.60 |

Example 37

Effect of Organic Treatment Environment on NiW Catalysts

For this experiment, two samples were prepared of $NiWO_4//(oleylamine)_{0.13}/(citric\ acid)_{0.15}$. The $NiWO_4$ was prepared as described in Comparative Example 1, followed by drying and calcination at about 300° C., and then cooling to ambient/room temperature. Oleylamine (70% technical grade, commercially available from Aldrich of Milwaukee, Wis.) was mixed together with an aqueous solution of citric acid and heated to about 100° C. to form a solution. Both samples of calcined $NiWO_4$ were likewise heated to about 100° C., and then an amount of the solution was used to simultaneously co-impregnate the organic components into/onto each sample, the amount being sufficient to attain a mole ratio of $NiWO_4$ to oleylamine of about 1:0.13 and to attain a mole ratio of $NiWO_4$ to citric acid of about 1:0.15. These impregnated samples were each dried in a drying furnace overnight at about 100° C. and then prepared for infrared analysis.

Transmission infrared spectra characterizing the samples were collected using a Thermo Scientific Nicolet 6700 FT-IR spectrometer equipped with a MCT detector and are shown in FIGS. 16A-B. About 0.012 to 0.016 g of each sample were mixed with about 0.04 g of diamond powder and pressed into self-supporting wafers that were loaded into an IR cell connected to a vacuum/adsorption system, which allowed recording of spectra while the treatment gases flowed through and around the wafer during infrared characterization. The IR spectra were collected, processed and analyzed with Thermo Scientific Omnic V7.1 software. Each reported spectrum is the average of about 256 scans across the range front about 4000 $cm^{-1}$ to about 1000 $cm^{-1}$, with a spectral resolution of about 4 $cm^{-1}$. The reported spectra were each normalized by subtracting a background spectrum of an empty IR cell. Peak deconvolution and fitting analysis was done using symmetric Gaussian functions in the 2000-1200 $cm^{-1}$ region with Omnic V7.1 commercial software, though other commercial software, such as OriginLab or PeakFit, could have alternately been used.

The first sample was placed in an IR cell and subject to a flow of ~20 vol % oxygen in helium (oxidative environment) at about 100° C. for about 90 minutes, at which time a transmission IR spectrum was collected (FIG. 16A-1, dashed line). Immediately thereafter, that same sample was subject to a flow of ~20 vol % oxygen in helium (oxidative environment) at about 230° C. for about 240 minutes, at which time another spectrum was collected (FIG. 16A-2, solid line). The second sample was placed in an IR cell and subject to a flow of ~100% helium (non-oxidative environment) at about 100° C. for about 90 minutes, at which time a transmission IR spectrum was collected (FIG. 16B-3, dashed line) Immediately thereafter, that same sample was subject to a flow of ~100% helium (non-oxidative environment) at about 230° C. for about 240 minutes, at which time another spectrum was collected (FIG. 16B-4 solid line).

Regarding the spectra in FIG. 16A, of particular interest on spectrum (2) were infrared bands centered at maxima of about 1773 $cm^{-1}$ and about 1715 $cm^{-1}$, along with two broad bands centered in the ~1570-1620 $cm^{-1}$ and ~1380-1450 $cm^{-1}$ regions. The fitting analysis of the sample treated in the higher-temperature oxidative environment (2) identified a peak extending from about 1618 $cm^{-1}$ to about 1812 $cm^{-1}$ and centered at about 1715 $cm^{-1}$ with a height of about 0.40 a.u., a full width at half maximum (FWHM) of about 63 $cm^{-1}$, and an integrated area of about 27.0 a.u. The feature centered at about 1773 $cm^{-1}$ was fitted with a peak extending from about 1723 $cm^{-1}$ to about 1841 $cm^{-1}$ with a height of about 0.16 a.u., a FWHM of about 51 $cm^{-1}$, and an integrated area of about 8.66 a.u. The most prominent peak identified at lower wavenumbers extended from about 1290 $cm^{-1}$ to about 1512 $cm^{-1}$ and was centered at about 1400 $cm^{-1}$ with a height of about 0.12 a.u., a FWHM of about 81 $cm^{-1}$, and an integrated area of about 9.98 a.u. In contrast, the fitting analysis of the sample treated in the lower-temperature oxidative environment (1) identified a peak extending from about 1626 $cm^{-1}$ to about 1816 $cm^{-1}$ and centered at about 1722 $cm^{-1}$ with a height of about 0.26 a.u., a FWHM of about 66 $cm^{-1}$, and an integrated area of about 18.1 a.u. The peak centered at about 1395 $cm^{-1}$ (ranging from about 1310 $cm^{-1}$ to about 1440 $cm^{-1}$) had a height of about 0.30 a.u., a FWHM of about 110 cm$^{-1}$, and an integrated area of about 34.8 a.u. No peak was identified in the region around 1773 cm$^{-1}$ for this sample. For the sample treated in the higher-temperature oxidative environment (2), the ratio of the height and integrated area of the peak centered at about 1715 cm$^{-1}$, compared to the one centered at about 1400 cm$^{-1}$, was about 3.5 and about 2.7, respectively. In comparison, for the sample treated in the lower-temperature oxidative environment (1), the ratio of the height and integrated area of the peak centered at about 1715 cm$^{-1}$, compared to the one centered at about 1400 cm$^{-1}$, was about 0.87 and about 0.52, respectively.

Regarding the spectra in FIG. 16B, of particular interest on spectrum (4) were infrared bands centered at maxima of about 1773 cm$^{-1}$ and about 1698 cm$^{-1}$, along with broad bands centered in the ~4570-1620 cm$^{-1}$ and ~1380-1450 cm$^{-1}$ regions. The fitting analysis of the sample treated in the higher-temperature non-oxidative environment (4) identified a peak extending from about 1653 cm$^{-1}$ to about 1765 cm$^{-1}$ and centered at about 1706 cm$^{-1}$ with a height of about 0.15 a.u., a FWHM of about 39 cm$^{-1}$, and an integrated area of about 6.17 a.u. The feature centered at about 1671 cm$^{-1}$ was fitted with a peak extending from about 1582 cm$^{-1}$ to about 1761 cm$^{-1}$ with a height of about 0.17 a.u., a FWHM of about 64 cm$^{-1}$, and an integrated area of about 11.6 a.u. The most prominent peak identified at lower wavenumbers extended from about 1416 cm$^{-1}$ to about 1495 cm$^{-1}$ and was centered at about 1455 cm$^{-1}$ with a height of about 0.11a.u., a FWHM of about 29 cm$^{-1}$, and an integrated area of about 3.31a.u. The featured centered at about 1410 cm$^{-1}$ was fitted with a peak extending from about 1324 cm$^{-1}$ to about 1482 cm$^{-1}$ with a height of about 0.10 a.u., a FWHM of about 62 cm$^{-1}$, and an integrated area of about 6.85 a.u. In contrast, the fitting analysis of the sample treated in the lower-temperature non-oxidative environment (3) identified a peak extending from about 1630 cm$^{-1}$ to about 1815 cm$^{-1}$ and centered at about 1723 cm$^{-1}$ with a height of about 0.17 a.u., a FWHM of about 66 cm$^{-1}$, and an integrated area of about 11.81a.u. The peak centered at about 1415 cm$^{-1}$ (ranging from about 1284 cm$^{-1}$ to about 1540 cm$^{-1}$) had a height of about 0.14, a FWHM of about 95 cm$^{-1}$, and an integrated area of about 14.27 a.u. No peak was identified in the region around 1773 cm$^{-1}$ for that spectrum. For the sample treated in the higher-temperature non-oxidative environment (4), the ratio of the height and integrated area of the peak centered at about 1715 cm$^{-1}$, compared to the one centered at about 1410 cm$^{-1}$, was about 1.4 and about 0.9, respectively. In comparison, for the sample treated in the lower-temperature non-oxidative environment (3), the ratio of the height and integrated area of the peak centered at about 1715 cm$^{-1}$, compared to the one centered at about 1410 cm$^{-1}$, was about 1.2 and about 0.8, respectively.

Although the peaks in these spectra have been identified herein by their wavenumber (cm$^{-1}$), those peaks can be correlated to specific bond excitations (stretches, wags, bends, etc.), based on various factors including (but not necessarily limited to) the wavenumber position of peaks and the physico-chemical nature of bonds known or presumed to exist within each sample. Without being bound by theory, in the infrared spectra described herein, the peaks centered at about 1773 cm$^{-1}$ and at about 1715 cm$^{-1}$ were presumptively assigned to C=O stretching in aldehyde-type carbonyl bonds and C=C stretching in non-aromatic unsaturated hydrocarbon bonds, respectively. The broad feature centered at around 1380-1450 cm$^{-1}$ was presumptively assigned to a combination of infrared bands from C=C stretching in aromatic rings, and the broad feature centered at about 1570-1620 cm$^{-1}$ was presumptively assigned to a combination of infrared bands from C=C stretching in aromatic rings and C=C stretching in non-aromatic unsaturated hydrocarbons. Based on the approximate intensities of the infrared peaks described above, the concentration of non-aromatic unsaturated hydrocarbons observed by IR spectroscopy appears to be somewhat higher than that of aromatic hydrocarbons in the sample treated in the higher-temperature oxidative environment, compared to the sample treated in the higher-temperature non-oxidative environment.

Example 38

Equimolar Amount of First and Second Organic Compounds

Two samples of NiWO$_4$ were prepared as described in Comparative Example 1, followed by drying and calcination of each at about 300° C., and then cooling to ambient/room temperature. For the equimolar oleylamine-oleic acid sample, oleylamine (70% technical grade, commercially available from Aldrich of Milwaukee, Wis.) was mixed together with oleic acid (90% technical grade, commercially available from Aldrich of Milwaukee, Wis.) at ambient/room temperature to form a solution. One sample of calcined NiWO$_4$ at ambient/room temperature was exposed to an amount of the oleylamine-oleic acid solution to simultaneously co-impregnate the organic components into/onto the sample, the amount being sufficient to attain a mole ratio of NiWO$_4$ to oleylamine of about 1:0.074 and to attain a mole ratio of NiWO$_4$ to oleic acid of about 1:0.094. For the equimolar oleylamine-citric acid sample, the other sample of calcined NiWO$_4$ at ambient/room temperature was impregnated first with oleylamine (70% technical grade, commercially available from Aldrich of Milwaukee, Wis.), such that the mole ratio of NiWO$_4$ to oleylamine was about 1:0.11. The sample was placed into a drying oven and maintained at about 100° C. overnight and cooled to ambient/room temperature. The dried sample was then impregnated with an aqueous citric acid solution, such that the NiWO$_4$ to citric acid mole ratio was about 1:0.15. Although the nominal molar ratios do not appear on their face to be equimolar, it should be noted that, once they are adjusted for their respective purities (e.g., 70% oleylamine, 90% oleic acid, etc.), the actual molar ratios are approximately equimolar.

Both samples were then dried at about 100° C. overnight in a drying furnace and were subsequently placed in a box furnace (in air) and heated at a rate of about 0.5° C./min to a final temperature of about 220° C. Both samples were held at that temperature for about 4 hours and were then cooled to ambient/room temperature and removed from the furnace. The equimolar oleylamine-oleic acid sample was labeled OLE$_{EQ}$, and the equimolar oleylamine-citric acid sample was labeled CIT$_{EQ}$. The equimolar samples were compared against a reference catalyst (B) that was not treated with any organics. These samples were then sulfided and tested for catalytic HDN activity through contacting with a VGO feed having the properties listed in Table 32 above in the same manner and under the same conditions as in Example 36. The results, including the HDN activities on a relative volume basis (i.e., RVAs) and on a relative molar basis (i.e., RMAs), are shown in Table 34 below.

TABLE 34

| Catalyst | Days on stream | N content [wppm] | RVA | RMA |
|---|---|---|---|---|
| OLE$_{EQ}$ | 12 | 114 | 1.71 | 1.58 |
| CIT$_{EQ}$ | 12 | 107 | 1.75 | 1.54 |
| B | 12 | 344 | 1.00 | 1.00 |

It is noted that the samples containing equimolar quantities of the first and second organic compounds show distinct improvement, though not as profound an improvement as the samples in which the amine-containing organic compound is present in a molar excess to the carboxylic acid-containing organic compound.

Example 39

Effect of Reducing Content of Group 8-10 Metal

A first sample containing equimolar amounts of nickel and tungsten ($NiWO_4$) was prepared according to Comparative Example 1. After it was dried and calcined at about 300° C., it was composited with an inert binder and formed into an extrudate having an average diameter of about 1.3 mm, such that about 7 wt % of the weight of the extrudate was the inert binder (with the remainder being the mixed metal oxide). Oleylamine (70% technical grade, commercially available from Aldrich of Milwaukee, Wis.) was mixed together with oleic acid (90% technical grade, commercially available from Aldrich of Milwaukee, Wis.) and heated to about 100° C. to form a solution. The first sample of calcined equimolar $NiWO_4$ was likewise heated to about 100° C., and then an amount of the solution was used to simultaneously co-impregnate the organic components into/onto the sample, the amount being sufficient to attain a mole ratio of $NiWO_4$ to oleylamine of about 1:0.10 and to attain a mole ratio of $NiWO_4$ to oleic acid of about 1:0.06. This impregnated sample was dried in air in a drying furnace overnight at about 100° C. The sample was then placed in a box furnace, heated in air at about 0.5° C./min up to about 230° C., and held for about 4 hours at that temperature. This sample was then cooled to ambient/room temperature and removed from the furnace (labeled as catalyst AA).

A second sample was prepared using a similar procedure to Comparative Example 1, but adjusting the ingredients to provide a nickel-to-tungsten molar ratio of only about 0.75:1. After it was dried, calcined at about 300° C., and then cooled to ambient/room temperature, an XRD spectrum was taken (not shown), which appeared to have features roughly similar to the equimolar nickel-tungsten oxide, as calcined. Oleylamine (70% technical grade, commercially available from Aldrich of Milwaukee, Wis.) was mixed together with oleic acid (90% technical grade, commercially available from Aldrich of Milwaukee, Wis.) and heated to about 100° C. to form a solution. The second sample of calcined $Ni_{0.75}WO_{3.75}$ was likewise heated to about 100° C., and then an amount of the solution was used to simultaneously co-impregnate the organic components into/onto the sample, the amount being sufficient to attain a mole ratio of $Ni_{0.75}WO_{3.75}$ to oleylamine of about 1:0.10 and to attain a mole ratio of $Ni_{0.75}WO_{3.75}$ to oleic acid of about 1:0.06. This impregnated sample was dried in air in a drying furnace overnight at about 100° C. The sample was then placed in a box furnace, heated in air at about 0.5° C./min up to about 220° C., and held for about 4 hours at that temperature. This sample was then cooled to ambient/ room temperature and removed from the furnace (labeled as catalyst Y).

A third sample was prepared using a similar procedure to Comparative Example 1, but adjusting the ingredients to provide a nickel-to-tungsten molar ratio of only about 0.5:1. After it was dried and calcined at about 300° C., and then cooled to ambient/room temperature, an XRD spectrum was taken (not shown), which appeared to have several different features from the calcined first and second samples, including (but not limited to) sharper [002] stacking peak and a collection of peaks more analogous to a heteropoly phase configuration than to a typical hexagonal nickel tungstate. Oleylamine (70% technical grade, commercially available from Aldrich of Milwaukee, Wis.) was mixed together with oleic acid (90% technical grade, commercially available from Aldrich of Milwaukee, Wis.) and heated to about 100° C. to form a solution. The second sample of calcined $Ni_{0.5}WO_{3.5}$ was likewise heated to about 100° C., and then an amount of the solution was used to simultaneously co-impregnate the organic components into/onto the sample, the amount being sufficient to attain a mole ratio of $Ni_{0.5}WO_{3.5}$ to oleylamine of about 1:0.10 and to attain a mole ratio of $Ni_{0.5}WO_{3.5}$ to oleic acid of about 1:0.06. This impregnated sample was dried in air in a drying furnace overnight at about 100° C. The sample was then placed in a box furnace, heated in air at about 0.5° C./min up to about 220° C., and held for about 4 hours at that temperature. This sample was then cooled to ambient/room temperature and removed from the furnace (labeled as catalyst Z).

A fourth sample was prepared using a similar procedure to Comparative Example 1, but adjusting the ingredients to provide a nickel-to-tungsten molar ratio of about 1.2:1, followed by drying, calcination at about 300° C., and then cooling to ambient/room temperature. Oleylamine (70% technical grade, commercially available from Aldrich of Milwaukee, Wis.) was mixed together with oleic acid (90% technical grade, commercially available from Aldrich of Milwaukee, Wis.) and heated to about 100° C. to form a solution. The second sample of calcined $Ni_{1.2}WO_{4.2}$ was likewise heated to about 100° C., and then an amount of the solution was used to simultaneously co-impregnate the organic components into/ onto the sample, the amount being sufficient to attain a mole ratio of $Ni_{1.2}WO_{4.2}$ to oleylamine of about 1:0.10 and to attain a mole ratio of $Ni_{1.2}WO_{4.2}$ to oleic acid of about 1:0.06. This impregnated sample was dried in air in a drying furnace overnight at about 100° C. The sample was then placed in a box furnace, heated in air at about 0.5° C./min up to about 220° C., and held for about 4 hours at that temperature. This sample was then cooled to ambient/room temperature and removed from the furnace (labeled as catalyst X).

These samples were compared against a reference catalyst (B) that was not treated with any organics. All these samples were then sulfided and tested for catalytic HDN activity through contacting with a VGO feed having the properties listed in Table 32 above in the same manner and under the same conditions as in Example 36. The results, including the HDN activities on a relative volume basis (i.e., RVAs) and on a relative molar basis (i.e., RMAs), are shown in Table 35 below.

TABLE 35

| Catalyst | Days on stream | N content [wppm] | RVA | RMA |
|---|---|---|---|---|
| X | 26 | 141 | 1.44 | 1.76 |
| AA | 27 | 108 | 1.64 | 1.70 |
| Y | 27 | 155 | 1.42 | 1.20 |
| Z | 27 | 256 | 1.12 | 0.87 |
| B | 28 | 311 | 1.00 | 1.00 |

It is noted that, in these experiments, the HDN activity of the 0.75 Ni:W ratio catalyst still exhibited a modest increase, on a molar basis, due to the dual organic treatment, while the HDN activity of the 0.5 Ni:W ratio catalyst showed a decrease, on a molar basis, despite the dual organic treatment. Nevertheless, the equimolar Ni:W catalyst and the catalyst having an Ni:W ratio greater than 1 showed 70% or greater relative molar HDN activity. Thus, Ni:W ratios at or above 0.75 seem to be desirable, with about equimolar to somewhat above equimolar Ni:W ratios appearing to be particularly desirable on a relative molar activity basis.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A bulk mixed metal catalyst precursor composition produced by heating a composition comprising one metal from Group 6 of the Periodic Table of the Elements, at least one metal from Groups 8-10 of the Periodic Table of the Elements, and a reaction product formed from (i) a first organic compound containing at least one amine group and at least 10 carbon atoms or (ii) a second organic compound containing at least one carboxylic acid group and at least 10 carbon atoms, but not both (i) and (ii), wherein the reaction product contains additional unsaturated carbon atoms, relative to (i) the first organic compound or (ii) the second organic compound, wherein the metals of the catalyst precursor composition are arranged in a crystal lattice, and wherein the reaction product is not located within the crystal lattice, to a temperature from about 195° C. to about 250° C. for a time sufficient for the first or second organic compounds to form a reaction product in situ that contains unsaturated carbon atoms not present in the first or second organic compounds.

2. A bulk mixed metal hydroprocessing catalyst composition produced by sulfiding the catalyst precursor composition of claim 1.

3. The catalyst precursor composition of claim 1, wherein one or more of the following are satisfied:
the catalyst precursor composition exhibits a content of unsaturated carbon atoms, as measured according to peak area comparisons using $^{13}$C NMR techniques, of at least 29%;
the catalyst precursor composition exhibits an increase in content of unsaturated carbon atoms, as measured according to peak area comparisons using $^{13}$C NMR techniques, of at least about 17%, compared to a collective content of unsaturated carbon atoms present in the first or second organic compound;
the catalyst precursor composition exhibits a ratio of unsaturated carbon atoms to aromatic carbon atoms, as measured according to peak area ratios using infrared spectroscopic techniques of a deconvoluted peak centered from about 1700 cm-1 to about 1730 cm-1, compared to a deconvoluted peak centered from about 1380 cm$^{-1}$ to about 1450 cm$^{-1}$, of at least 0.9; and
the catalyst precursor composition exhibits a ratio of unsaturated carbon atoms to aromatic carbon atoms, as measured according to peak area ratios using infrared spectroscopic techniques of a deconvoluted peak centered from about 1700 cm$^{-1}$ to about 1730 cm$^{-1}$, compared to a deconvoluted peak centered from about 1380 cm$^{-1}$ to about 1450 cm$^{-1}$, of up to 15.

4. The bulk mixed metal catalyst precursor of claim 2, wherein one or more of the following are satisfied:
the sulfided bulk mixed metal catalyst precursor exhibits a layered structure comprising a plurality of stacked layers of sulfided Group 6 metal, such that the average number of stacked layers is from about 1.5 to about 3.5;
the sulfided bulk mixed metal catalyst precursor exhibits a layered structure comprising a plurality of stacked layers of sulfided Group 6 metal, such that the average number of stacked layers is at least about 0.8 stacked layers less than an identical sulfided bulk mixed metal catalyst precursor that has not been treated using first or second organic compounds;
upon exposure of the sulfided bulk mixed metal catalyst precursor to a vacuum gasoil feedstock under hydroprocessing conditions, the sulfided bulk mixed metal catalyst precursor exhibits a hydrodenitrogenation RMA of at least 57% greater than a sulfided catalyst composition that has not been treated using first or second organic compounds;
upon exposure of the sulfided bulk mixed metal catalyst precursor to a vacuum gasoil feedstock under hydroprocessing conditions, the sulfided bulk mixed metal catalyst precursor exhibits a hydrodenitrogenation RMA of up to 500% greater than a sulfided catalyst composition that has not been treated using first or second organic compounds;
upon exposure of the sulfided bulk mixed metal catalyst precursor to a vacuum gasoil feedstock under hydroprocessing conditions, the sulfided bulk mixed metal catalyst precursor exhibits a hydrodenitrogenation RMA at least 30% greater than a sulfided catalyst composition that has been treated with only a single organic compound having less than 10 carbon atoms; and
upon exposure of the sulfided bulk mixed metal catalyst precursor to a vacuum gasoil feedstock under hydroprocessing conditions, the sulfided bulk mixed metal catalyst precursor exhibits a hydrodenitrogenation RMA up to 500% greater than a sulfided catalyst composition that has been treated with only a single organic compound having less than 10 carbon atoms.

5. A bulk mixed metal catalyst precursor composition according to claim 1 in which the metal from Group 6 of the Periodic Table of the Elements is tungsten.

6. A bulk mixed metal catalyst precursor composition according to claim 5 comprising one metal from Group 8 of the Periodic Table of the Elements.

7. A bulk mixed metal catalyst precursor composition according to claim 6 in which the metal from Group 8 of the Periodic Table of the Elements is nickel.

8. A bulk mixed metal catalyst precursor composition according to claim 1 in which the composition comprising the metals from Group 6 and Groups 8-10 of the Periodic Table of the Elements, and the reaction product containing additional unsaturated carbon atoms is formed from the first or second organic compounds by heating to a temperature from about 195° C. to about 250° C. in an oxidizing atmosphere.

9. A bulk mixed metal hydroprocessing catalyst composition produced by sulfiding the catalyst precursor composition of claim 8.

10. A process for producing a catalyst precursor composition containing in situ-formed unsaturated carbon atoms, the process comprising:
(a) treating a catalyst precursor composition comprising one metal from Group 6 of the Periodic Table of the Elements, at least one metal from Groups 8-10 of the Periodic Table of the Elements, with a first organic compound containing at least one amine group and at least 10 carbons or a second organic compound containing at least one carboxylic acid group and at least 10 carbons, to form an organically treated precursor catalyst composition; and
(b) heating said organically treated precursor catalyst composition at a temperature from about 195° C. to about 250° C. for a time sufficient for the first or second organic compounds to react to form additional in situ unsaturated carbon atoms not present in the first or second organic compounds, but not for so long that more than 50% by weight of the first or second organic compound is volatilized, thereby forming a catalyst precursor composition containing in situ formed unsaturated carbon atoms.

11. The process of claim 10, wherein said one metal from Group 6 is Mo or W, and wherein said at least one metal from Groups 8-10 is Co, Ni, or a combination thereof.

12. The process of claim 10, wherein said first organic compound comprises a primary monoamine having from 10 to 30 carbon atoms or said second organic compound comprises only one carboxylic acid group and has from 10 to 30 carbon atoms.

13. The process of claim 10, wherein the catalyst precursor composition containing in situ formed unsaturated carbon atoms is a bulk metal hydroprocessing catalyst precursor composition consisting essentially of the reaction product of the first organic compound or the second organic compound, an oxide form of the one metal from Group 6, an oxide form of the at least one metal from Groups 8-10, and optionally about 20 wt % or less of a binder.

14. A process for producing a sulfided hydroprocessing catalyst composition, comprising sulfiding the catalyst precursor composition containing in situ formed unsaturated carbon atoms made according to the process of claim 10 under conditions sufficient to produce the sulfided hydroprocessing catalyst composition.

15. A process for producing a sulfided hydroprocessing catalyst composition, comprising sulfiding the catalyst precursor composition containing in situ formed unsaturated carbon atoms made according to the process of claim 13 under conditions sufficient to produce the sulfided hydroprocessing catalyst composition.

16. A catalyst precursor composition containing in situ formed unsaturated carbon atoms made according to the process of claim 10.

17. A sulfided hydroprocessing catalyst composition made according to the process of claim 15.

18. The process of claim 10, wherein one or more of the following are satisfied:
the catalyst precursor composition exhibits a content of unsaturated carbon atoms, as measured according to peak area comparisons using 13C NMR techniques, of at least 29%;
the catalyst precursor composition exhibits an increase in content of unsaturated carbon atoms, as measured according to peak area comparisons using 13C NMR techniques, of at least about 17%, compared to a collective content of unsaturated carbon atoms present in the first or second organic compound;
the catalyst precursor composition exhibits a ratio of unsaturated carbon atoms to aromatic carbon atoms, as measured according to peak area ratios using infrared spectroscopic techniques of a deconvoluted peak centered from about 1700 $cm^{-1}$ to about 1730 $cm^{-1}$, compared to a deconvoluted peak centered from about 1380 $cm^{-1}$ to about 1450 $cm^{-1}$, of at least 0.9; and
the catalyst precursor composition exhibits a ratio of unsaturated carbon atoms to aromatic carbon atoms, as measured according to peak area ratios using infrared spectroscopic techniques of a deconvoluted peak centered from about 1700 $cm^{-1}$ to about 1730 $cm^{-1}$, compared to a deconvoluted peak centered from about 1380 $cm^{-1}$ to about 1450 $cm^{-1}$, of up to 15.

19. A process for producing a sulfided hydroprocessing catalyst composition, comprising sulfiding the catalyst precursor composition made according to the process of claim 10 under conditions sufficient to produce the sulfided hydroprocessing catalyst composition, wherein one or more of the following are satisfied:
the sulfided hydroprocessing catalyst composition exhibits a layered structure comprising a plurality of stacked layers of sulfided Group 6 metal, such that the average number of stacked layers is from about 1.5 to about 3.5;
the sulfided hydroprocessing catalyst composition exhibits a layered structure comprising a plurality of stacked layers of sulfided Group 6 metal, such that the average number of stacked layers is at least about 0.8 stacked layers less than an identical sulfided hydroprocessing catalyst composition that has not been treated using first or second organic compounds;
upon exposure of the sulfided hydroprocessing catalyst composition to a vacuum gasoil feedstock under hydroprocessing conditions, the sulfided hydroprocessing catalyst composition exhibits a hydrodenitrogenation RMA of at least 57% greater than a sulfided catalyst composition that has not been treated using first or second organic compounds;
upon exposure of the sulfided hydroprocessing catalyst composition to a vacuum gasoil feedstock under hydroprocessing conditions, the sulfided hydroprocessing catalyst composition exhibits a hydrodenitrogenation RMA of up to 500% greater than a sulfided catalyst composition that has not been treated using first or second organic compounds;
upon exposure of the sulfided hydroprocessing catalyst composition to a vacuum gasoil feedstock under hydroprocessing conditions, the sulfided hydroprocessing catalyst composition exhibits a hydrodenitrogenation RMA at least 30% greater than a sulfided catalyst composition that has been treated with only a single organic compound having less than 10 carbon atoms; and
upon exposure of the sulfided hydroprocessing catalyst composition to a vacuum gasoil feedstock under hydroprocessing conditions, the sulfided hydroprocessing catalyst composition exhibits a hydrodenitrogenation RMA up to 500% greater than a sulfided catalyst composition that has been treated with only a single organic compound having less than 10 carbon atoms.

20. A process according to claim 19 in which the heating of the organically treated precursor catalyst composition is carried out in an oxidizing atmosphere.

21. A sulfide hydroprocessing catalyst composition produced by the process of claim 20.

* * * * *